United States Patent
Agnello et al.

(10) Patent No.: US 12,275,666 B2
(45) Date of Patent: Apr. 15, 2025

(54) METHOD OF TREATING A SUBSTRATE SURFACE, APPARATUS THEREFOR, AND TREATED GLASS ARTICLES

(71) Applicant: Corning Incorporated, Corning, NY (US)

(72) Inventors: Gabriel Pierce Agnello, Corning, NY (US); Joy Banerjee, Corning, NY (US); Aize Li, Painted Post, NY (US); Robert George Manley, Vestal, NY (US); Huan-Hung Sheng, Horseheads, NY (US); Siva Venkatachalam, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 215 days.

(21) Appl. No.: 17/787,014

(22) PCT Filed: Jan. 5, 2021

(86) PCT No.: PCT/US2021/012155
§ 371 (c)(1),
(2) Date: Jun. 17, 2022

(87) PCT Pub. No.: WO2021/146075
PCT Pub. Date: Jul. 22, 2021

(65) Prior Publication Data
US 2023/0103045 A1  Mar. 30, 2023

Related U.S. Application Data

(60) Provisional application No. 62/962,529, filed on Jan. 17, 2020.

(51) Int. Cl.
C03C 15/00 (2006.01)
C03C 17/00 (2006.01)
C09K 13/08 (2006.01)

(52) U.S. Cl.
CPC ............ *C03C 15/00* (2013.01); *C03C 17/002* (2013.01); *C09K 13/08* (2013.01); *C03C 2218/34* (2013.01)

(58) Field of Classification Search
CPC .... C03C 15/00; C03C 17/002; C03C 2218/34
See application file for complete search history.

(56) References Cited

U.S. PATENT DOCUMENTS 4,256,533 A * 3/1981 Mayer ............... C03C 15/00
216/97
8,969,216 B2 3/2015 Prajapati et al.
(Continued)

FOREIGN PATENT DOCUMENTS

EP 1271484 A2 1/2003
EP 1721873 A1 11/2006
(Continued)

OTHER PUBLICATIONS

Feng et al., "Laser textured GFRP superhydrophobic surface as an underwater acoustic absorption metasurface"., Appl. Surf. Sci., vol. 463, 2019, pp. 741-746.
(Continued)

*Primary Examiner* — Alicia J Weydemeyer
(74) *Attorney, Agent, or Firm* — Kevin M. Able; Yunling Shang

(57) ABSTRACT

Apparatus and method for treating a substrate, for example texturing a substrate. In some embodiments, a masking material is applied to a surface of the substrate in a predetermined pattern, the surface thereafter contacted with an etchant that removes the masking material. Contacting the surface with the etchant produces multiple co-located textures. In other embodiments, the masking step can be eliminated, and the etchant is applied in a predetermined pattern to produce multiple co-located textures. In still other embodiments, the substrate has a chemical composition, and
(Continued)

the substrate is exposed to a leachant that leaches at least one constituent of the chemical composition to produce a substrate with a varying chemical composition at the substrate surface.

6 Claims, 19 Drawing Sheets

(56) References Cited

U.S. PATENT DOCUMENTS

| | | | |
|---|---|---|---|
| 10,698,151 | B2 | 6/2020 | Hamilton et al. |
| 2002/0012160 | A1 | 1/2002 | Kase et al. |
| 2009/0302001 | A1 | 12/2009 | Mayers et al. |
| 2015/0202712 | A1 | 7/2015 | Seghi et al. |
| 2016/0176171 | A1 | 6/2016 | Trpkovski |
| 2016/0223206 | A1 | 8/2016 | Bonitz et al. |
| 2018/0247831 | A1 | 8/2018 | Kirkpatrick et al. |
| 2020/0002224 | A1 | 1/2020 | Carleton et al. |
| 2020/0024183 | A1 | 1/2020 | Agnello et al. |
| 2021/0225661 | A1 | 7/2021 | Kirkpatrick et al. |

FOREIGN PATENT DOCUMENTS

| | | |
|---|---|---|
| EP | 2856532 A1 | 4/2015 |
| EP | 2874960 A1 | 5/2015 |
| EP | 2961713 A1 | 1/2016 |
| EP | 3041797 A1 | 7/2016 |
| JP | 2002-072922 A | 3/2002 |
| JP | 2012-171831 A | 9/2012 |
| JP | 2014-009124 A | 1/2014 |
| JP | 2018-052805 A | 4/2018 |
| JP | 2019-134075 A | 8/2019 |
| KR | 10-2017-0077967 A | 7/2017 |
| TW | 201727735 A | 8/2017 |
| WO | WO-2011032218 A1 * | 3/2011 ............ C03C 15/00 |
| WO | 2013/178702 A1 | 12/2013 |
| WO | 2014/012809 A1 | 1/2014 |
| WO | 2014/131610 A1 | 9/2014 |
| WO | 2015/032618 A1 | 3/2015 |
| WO | 2017/073580 A1 | 5/2017 |
| WO | 2017/102551 A1 | 6/2017 |
| WO | WO-2018152300 A1 * | 8/2018 ............ C03C 15/00 |

OTHER PUBLICATIONS

Fernando et al., The influence of precursor addition order on the porosity of sol-gel bioactive glasses., Dent. Mater, vol. 34, 2018, pp. 1323-1330.

International Search Report and Written Opinion of the International Searching Authority; PCT/US2021/012155 Mailed on Apr. 27, 2021, 10 pages; Korean Patent Office.

Rayerfrancis et al., "Glass surface etching with Aluminium-induced texture process for thin film solar cell applications", Mater. Lett., vol. 221, 2018, pp. 305-308.

Unal et al., "Near-unity haze by aluminum induced glass texturing: structural evolution of Al/glass interface and its impact on texturing", Opt. Mater. Express, vol. 7, 2017, pp. 3051-3064.

Chinese Patent Application No. 202180014557.9, Office Action dated Nov. 29, 2023, 5 pages (English Translation only), Chinese Patent Office.

Taiwanese Patent Application No. 110101075, Office Action dated Jun. 24, 2024, 2 pages (English Translation only), Taiwanese Patent Office.

Korean Patent Application No. 10-2022-7028483, Office Action dated Dec. 3, 2024, 5 pages (English Translation only), Korean Patent Office.

* cited by examiner

METHOD OF TREATING A SUBSTRATE SURFACE, APPARATUS THEREFOR, AND TREATED GLASS ARTICLES

CROSS-REFERENCE TO RELATED APPLICATIONS

This application claims the benefits of priority under 35 U.S.C. § 371 of International Application Serial No.: PCT/US2021/012155, filed on Jan. 5, 2021, which claims the benefit of priority under 35 U.S.C. § 119 of U.S. Provisional Application Ser. No. 62/962,529 filed on Jan. 17, 2020, the contents of which are relied upon and incorporated herein by reference in their entirety.

BACKGROUND

Field

The present disclosure relates to methods of treating a substrate surface including methods of forming a substrate surface with an anisotropic surface texture, apparatus for forming an anisotropic surface texture, and articles comprising an anisotropic surface texture.

Technical Background

It is known to texture surfaces of substrates, for example glass substrates, for such diverse applications as light scattering and/or light trapping (e.g., in the solar panel industry), bioactivity enhancement in the medical arts, reduction of contact charging phenomena specific to the flat panel display industry, and sonar detection. Methods of texturing can include wet etching with an etchant, dry etching, for example with a plasma discharge, and laser ablation. Lasers can be used to physically ablate the substrate, inducing small defects in the form of cracks and/or pits, or alter the substrate structure locally via heating and/or phase change, and wet or dry chemical etching in various forms is widely utilized across many different industries to controllably engineer substrate surfaces and produce random or periodic features based on need. Such methods, however, are typically homogeneous in that they are uniformly applied to an entire surface of the substrate and produce an isotropic surface characteristic (e.g., roughness). Glass thermal history during formation or post-relaxation thermal cycling can alter the textured surface on a micro- or macro-scale. While texturing substrate surfaces is not difficult given the quantity of available methods, deliberately patterning multiple types of features onto a substrate surface using a single step process has not been clearly demonstrated.

A substrate surface exhibiting one or more anisotropic textures may enable multiple functionalities for the same product. From a manufacturability standpoint, such a product can provide an even more attractive technology pathway, without the addition of costly capital engineering upgrades.

SUMMARY

In accordance with the present disclosure, a substrate, for example a glass substrate, is disclosed comprising a first major surface comprising a periodic first texture, the first texture comprising a first magnitude and a first spatial period in a first direction along a first axis, the first texture extending a length along the first axis equal to or greater than two times the first spatial period. The first magnitude can, for example, be in a range from about 2 nanometers to about 500 nanometers. The first spatial period can be in a range from about 0.1 millimeters to about 100 millimeters.

The first major surface may further comprise an isotropic second texture co-located with the first texture, the second texture comprising an average surface roughness Sa equal to or less than about 1 nanometer.

The first major surface may still further comprise a periodic third texture co-located with the first texture, for example collocated with the first texture and the second texture, the third texture comprising a second magnitude and a second spatial period along a second axis different from the first axis, the second texture extending a length along the second axis equal to or greater than two times the second spatial period.

The second axis can be orthogonal to the first axis. The second magnitude can be in a range from about 2 nm to about 500 nm. The second spatial period can be in a range from about 0.1 mm to about 25 mm.

In another embodiment, a substrate is described, for example a glass substrate, comprising a first major surface comprising a periodic first texture comprising a first magnitude and a first spatial period in a first direction along a first axis, the first texture extending a length along the first axis equal to or greater than two times the first spatial period, and an isotropic second texture co-located with the first texture. The first magnitude can be in a range from about 2 nanometers to about 100 nanometers. The first spatial period can be in a range from about 0.1 millimeters to about 100 millimeters. An average surface roughness Sa of the second texture can be equal to or less than about 1 nanometer.

The glass substrate may further comprise a periodic third texture co-located with the first texture, for example co-located with the first texture and the second texture, the third texture comprising a second magnitude and a second spatial period along a second axis different from the first axis, the second texture extending a length along the second axis equal to or greater than two times the second spatial period. The second axis can be orthogonal to the first axis. The second magnitude can be in a range from about 2 nm to about 50 mm. The second spatial period can be in a range from about 0.1 mm to about 25 mm.

The substrate may still further comprise a periodic fourth texture co-located with the first texture, for example co-located with the first texture, the second texture and the third texture, the fourth texture comprising a third magnitude and a third spatial period along the second axis, the fourth texture extending a length along the second axis equal to or greater than two times the third spatial period. The third magnitude can be in a range from about 2 nanometers to about 500 nanometers. The third spatial period can be in a range from about 0.1 millimeters to about 25 millimeters.

In still another embodiment, a method of texturing a substrate, for example a glass substrate, is disclosed comprising conveying the substrate along a conveyance path in a conveyance direction and applying a masking material to a first major surface of the substrate in a first predetermined pattern as the substrate is conveyed. An etchant is applied over the first area of the first major surface after the applying the masking material as the substrate is conveyed, the etchant etching the first major surface, removing the masking material, and forming a first texture with a first magnitude and a first spatial period along a first axis in the first area. The etching may further form a second texture on the first major surface, for example co-located with the first texture, the second texture comprising an average surface roughness Sa less than about 1 nanometer. The first texture can be anisotropic. The second texture can be isotropic. The first magnitude can be in a range from about 2 nm to about 100 nm. The first period can be in a range from about 0.1 millimeters to about 100 millimeters.

The etching may still further form a third texture co-located with the first texture, for example co-located with the first texture and the second texture, the third texture comprising a second magnitude and a second spatial period along a second axis different from the first axis. The third texture can be anisotropic.

The etching may yet further form a fourth texture co-located with the first texture, for example co-located with the first texture, the second texture and the third texture, the fourth texture comprising a third magnitude and a third spatial period along the second axis. The second axis can be orthogonal to the first axis.

In some embodiments, the first pattern can comprise parallel, spaced-apart rows of alternating peaks and valleys.

In some embodiments, the masking material can be uncured while the etchant is applied. The masking material may comprise a polymer, such as a polyurethane, a polyolefin, an acrylate, a novolac, or a silicone. In some embodiments, the masking material can comprise styrene maleic acid.

In various embodiments, a removal rate of the masking material by the etchant can be less than a dissolution rate of the substrate surface. For example, in some embodiments, the masking material can be completely removed from the first major surface during the etching.

The applying the masking material may comprise applying the masking material with a roller comprising a plurality of ridges. The plurality of ridges can, for example, be concentric with a shaft of the roller. The plurality of ridges can be formed by a plurality of wheels arranged along an axis of rotation orthogonal to the conveyance direction.

In some embodiments, the plurality of ridges can be parallel with a shaft of the roller.

In various embodiments, the applying the masking material can comprise applying the masking material with a plurality of roller assemblies.

In various embodiments, the etchant can comprise HF, $H_3PO_4$, or a combination thereof.

In yet other embodiments, a method of texturing a substrate, for example a glass substrate, is disclosed comprising conveying the substrate along a conveyance path in a conveyance direction and applying an etchant on a first major surface of the substrate in a predetermined pattern as the substrate is conveyed. The etchant etches the first major surface and forms a first texture with a first magnitude and a first spatial period along a first axis.

The etching may further form a second texture on the first major surface co-located with the first texture, the second texture comprising a surface roughness Sa less than about 1 nanometer. The first texture can be anisotropic. The second texture can be isotropic. The first magnitude can be in a range from about 2 nanometers to about 100 nanometers. The first period can be in a range from about 0.1 millimeters to about 100 millimeters.

In some embodiments, the etching can form a third texture co-located with the first texture, for example co-located with the first texture and the second texture, the third texture comprising a second magnitude and a second spatial period along a second axis different from the first axis. The third texture can be anisotropic.

In some embodiments, the etching may form a fourth texture co-located with the first texture, for example co-located with the first texture, the second texture, and the third texture, the fourth texture comprising a third magnitude and a third spatial period along the second axis. The second axis can be orthogonal to the first axis.

In various embodiments, the first pattern can comprise parallel, spaced-apart rows of alternating peaks and valleys.

In some embodiments, the applying the etchant can comprise contacting the first major surface with a roller comprising a plurality of ridges. The plurality of ridges can be formed, for example, by a plurality of wheels aligned along an axis of rotation orthogonal to the conveyance direction.

The applying the etchant may comprise contacting the first major surface with a plurality of roller assemblies.

The etchant may comprise HF, $H_3PO_4$, or a combination thereof.

In another embodiment, a substrate, for example a glass substrate, is described comprising a first surface comprising a first chemical composition, a concentration of at least one constituent of the first chemical composition varying periodically with a first spatial period along a first axis.

The concentration of the at least one constituent can vary periodically with a second spatial period along a second axis different from the first axis. An angle between the first axis and the second axis can be greater than zero degrees and equal to or less than 90 degrees.

In yet another embodiment, a method of making a substrate, for example a glass substrate, with an anisotropic surface chemical composition is disclosed comprising conveying the glass sheet along a conveyance path in a conveyance direction, applying a masking material to a first area of a first major surface of the substrate in a first predetermined pattern as the substrate is conveyed, the first major surface comprising a first chemical composition, and applying a leachant on the first major surface as the substrate is conveyed, the leachant leaching at least one constituent of the first chemical composition from the first major surface and removing the masking material, a concentration of at least one constituent of the first chemical composition varying periodically along a first axis with a first spatial period after the leaching.

The first spatial period can be in a range from about 0.1 mm to about 100 mm.

In some embodiments, the concentration of the at least one constituent along a second axis different from the first axis can vary periodically with a second spatial period. The concentration along the second axis is anisotropic. The second axis can be orthogonal to the first axis.

In some embodiments, the masking material can be uncured while the leachant is applied.

The masking material can comprise a polymer, such as a polyurethane, a polyolefin, an acrylate, a novolac, or a silicone. In some embodiments, the masking material can comprise styrene maleic acid. In various embodiments, the masking material can be completely removed from the first major surface during the etching.

In some embodiments, the applying the masking material may comprise contacting the first major surface with a roller comprising a plurality of ridges. The plurality of ridges can be formed by a plurality of wheels aligned along an axis of rotation orthogonal to the conveyance direction. The applying the masking material may comprise applying the masking material with a plurality of roller assemblies.

The leachant can comprise, for example, at least one of HCl, $H_2SO_4$, $H_3PO_4$, or $HNO_3$.

The at least one constituent may comprise at least one of Mg, Ca, Sr, Al, or B.

In still other embodiments, a method of texturing a substrate, for example a glass substrate, is described comprising conveying the substrate along a conveyance path in a conveyance direction, applying a masking material to a major surface of the substrate as the substrate is conveyed, and applying a leachant over the major surface in a first predetermined pattern as the substrate is conveyed, the major surface comprising a first chemical composition, the leachant leaching at least one constituent of the first chemical composition from the first major surface, a concentration of the at least one constituent of the first chemical composition varying periodically along a first axis with a first spatial period after the leaching. The first texture can be anisotropic. The first magnitude can be in a range from about 2 nm to about 500 nm.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

It is to be understood that both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

DETAILED DESCRIPTION

Figure 1:
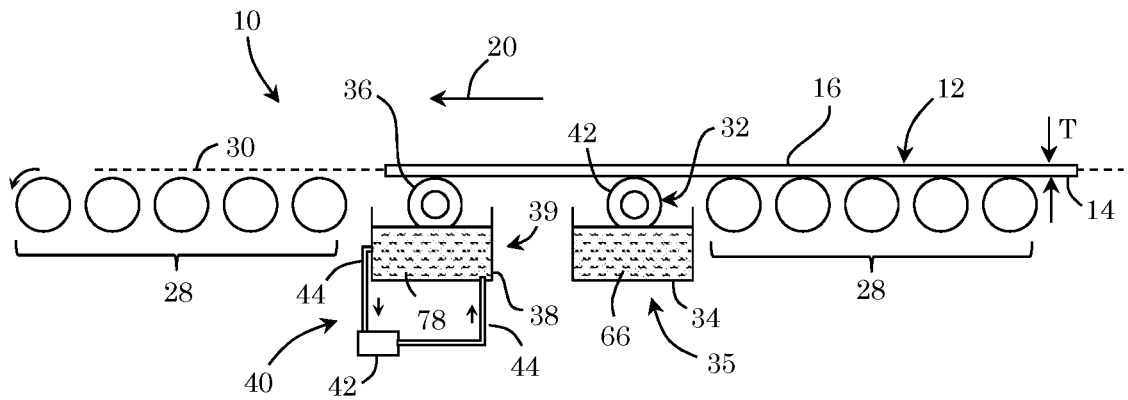
FIG. 1 is a side cross-sectional view of an exemplary treatment apparatus for treating a substrate in accordance with embodiments of the present disclosure.

Reference will now be made in detail to embodiments of the present disclosure, examples of which are illustrated in the accompanying drawings. Whenever possible, the same reference numerals will be used throughout the drawings to refer to the same or like parts. However, this disclosure can be embodied in many different forms and should not be construed as limited to the embodiments set forth herein.

As used herein, the term "about" means that amounts, sizes, formulations, parameters, and other quantities and characteristics are not, and need not be, exact, but may be approximate and/or larger or smaller, as desired, reflecting tolerances, conversion factors, rounding off, measurement error and the like, and other factors known to those of skill in the art.

Ranges can be expressed herein as from "about" one value, and/or to "about" another value. When such a range is expressed, another embodiment includes from the one value to the other value. Similarly, when values are expressed as approximations by use of the antecedent "about," it will be understood that the value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus, specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred in any respect. This holds for any possible non-express basis for interpretation, including matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural references unless the context clearly dictates otherwise. Thus, for example, reference to "a" component includes aspects having two or more such components, unless the context clearly indicates otherwise.

The word "exemplary," "example," or various forms thereof are used herein to mean serving as an example, instance, or illustration. Any aspect or design described herein as "exemplary" or as an "example" should not be construed as preferred or advantageous over other aspects or designs. Furthermore, examples are provided solely for purposes of clarity and understanding and are not meant to limit or restrict the disclosed subject matter or relevant portions of this disclosure in any manner. It can be appreciated that a myriad of additional or alternate examples of varying scope could have been presented but have been omitted for purposes of brevity.

As used herein, the terms "comprising" and "including", and variations thereof, shall be construed as synonymous and open-ended, unless otherwise indicated. A list of elements following the transitional phrases comprising or including is a non-exclusive list, such that elements in addition to those specifically recited in the list may also be present.

The terms "substantial," "substantially," and variations thereof as used herein are intended to represent that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, an anisotropic surface texture is a surface texture comprising an attribute different in a first direction across a major surface of a substrate than in a second direction different from the first direction across the major surface of the substrate, but which difference is substantially unvarying. For example, for a first line profile taken across a major surface of the substrate in a first orientation, and a second line profile taken across the major surface in a different orientation, for example orthogonal to the first line profile, a difference between an average roughness $Ra_1$ of the first line profile and an average roughness $Ra_2$ of the second line profile can be determined. However, regardless the location on the major surface over which the first line profile and the second line profile are obtained, provided the absolute orientation of the first line profile and the second line profile, and the relative orientations of the first line profile to the second line profile, remain the same, the difference between the selected characteristic of the first line profile and the second line profile is the same. That is, a magnitude of the first line profile average roughness stays the same regardless of position on the major surface, and a magnitude of the second line profile average roughness stays the same regardless of position on the major surface. Thus, the average roughness of a first line profile of a first predetermined length (wherein the predetermined length can be greater than two period lengths (i.e. repetitions) of the largest surface characteristic on the major surface) and a first orientation on the major surface taken at any location on the major surface is substantially equal, within measurement capability, to the average roughness of another line profile with the first predetermined length and the first orientation relative to the major surface taken at any other location on the major surface. Likewise, the average roughness of a second line profile of a second predetermined length (wherein the predetermined length can be greater than two period lengths (i.e. repetitions) of the largest surface characteristic on the major surface) with a second orientation different than the first orientation, taken at any location on the major surface, is substantially equal to the average roughness of another line profile of the second predetermined length and the second orientation taken at any other location on the major surface, and a difference between the average roughness of any of the first line profiles and the average roughness of any of the second line profiles is substantially constant.

Figure 2:
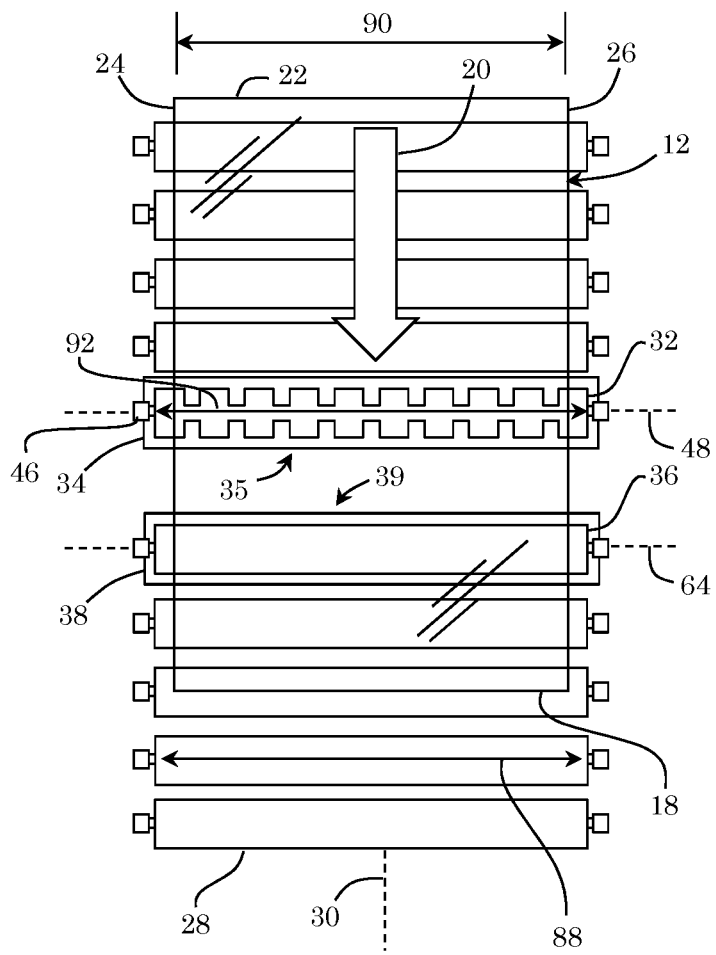
FIG. 2 is a top view of the treatment apparatus of FIG. 1.

Shown in FIGS. 1 and 2 is a cross-sectional side view and a top view, respectively, of an exemplary treatment apparatus 10 for treating a major surface of a substrate 12. As used herein, the term "substrate" includes sheets, plates, ribbons, or panes of material. A substrate may be a laminated substrate comprising a plurality of layers of the same or different material. Substrate 12 can comprise a glass-based material. As used herein, "glass-based" includes both glasses and glass-ceramics, wherein glass-ceramics have one or more crystalline phases and an amorphous, residual glass phase. A glass-based material (e.g., glass-based substrate) may comprise an amorphous material (e.g., glass) and optionally one or more crystalline materials (e.g., ceramic). Exemplary glass can include aluminosilicate glass, borosilicate glass, soda-lime glass, etc. In some embodiments, substrate 12 can comprise a silicon wafer or a silicon sheet). In further embodiments, substrate 12 can include lithium fluoride (LiF), magnesium fluoride ($MgF_2$), calcium fluoride ($CaF_2$), barium fluoride ($BaF_2$), sapphire ($Al_2O_3$), zinc selenide (ZnSe), germanium (Ge) or other materials. Substrate 12 may be used in various display applications such as liquid crystal displays (LCDs), electrophoretic displays (EPD), organic light emitting diode displays (OLEDs), or plasma display panels (PDPs).

Substrate 12 comprises a first major surface 14 and a second major surface 16 opposite first major surface 14. In some embodiments, first major surface 14 can be parallel to second major surface 16, although in other embodiments, first major surface 14 may not be parallel to second major surface 16. For example, in some embodiments, a cross-sectional shape of substrate 12 taken through a thickness of the substrate in a length direction or in a width direction orthogonal to the length direction can be wedge-shaped, wherein one of the first or second major surfaces is angled relative to the other of the first or second major surface, for example at an angle greater than 0 degrees (parallel) but less than about 10 degrees. Substrate 12 can comprise a thickness "T" in a range from about 50 micrometers (μm) to about 0.7 mm defined between first major surface 14 and second major surface 16, for example from about 50 μm to about 0.5 mm, wherein thickness T is measured orthogonal to one or both major surfaces. Other thicknesses and/or nonflexible configurations may be provided in further embodiments. For example, in other embodiments, substrate 12 may comprise a thickness in a range from about 50 μm to about 3 mm, such as in a range from about 0.5 mm to about 3 mm.

Substrate 12 may have a quadrilateral perimeter shape in a plane of the first or second major surface and comprise a leading edge 18 relative to a conveyance direction 20 of substrate 12, a trailing edge 22 opposite leading edge 18, and opposing side edges 24, 26. Conveyance direction 20 can be in the length direction of the substrate. In various embodiments, leading edge 18 and trailing edge 22 can be parallel edges. In embodiments, side edges 24 and 26 can be parallel edges. In some embodiments, leading edge 18 can be orthogonal to one or both of side edge 24 or side edge 26. For example, in some embodiments, substrate 12 can have a rectangular shape in a plane of one or both of first or second major surfaces 14 or 16, wherein side edges 24, 26 are parallel to conveyance direction 20 and leading and trailing edges 18, 22 are orthogonal to conveyance direction 20.

As shown in FIGS. 1 and 2, treatment apparatus 10 can comprise a plurality of conveyance rollers 28 configured to convey substrate 12 in conveyance direction 20 along conveyance path 30, a masking roller 32, a first container 34 forming a masking material reservoir 35, an etchant roller 36, and a second container 38 forming an etchant reservoir 39. Treatment apparatus 10 may further comprise an etchant circulation system 40 in fluid communication with reservoir 39 and configured to circulate etchant through second container 38 via pump 42 and piping 44.

Conveyance rollers 28 can be full-length rollers, rotatably mounted and configured to rotate about axes of rotation 64 wherein a length 88 of the conveyance rollers in a direction orthogonal to conveyance direction 20 can be equal to or greater than a width 90 of substrate 12 defined between first and second side edges 24, 26 (see FIG. 2A). Conveyance rollers 28 can be driven rollers. For example, conveyance rollers 28 can be coupled to a motor or motors (not shown) that rotate the conveyance rollers about their respective axes of rotation to convey substrate 12 in conveyance direction 20 along conveyance path 30. In other embodiments, conveyance rollers 28 may be non-driven and individually freely rotatable about their respective axes of rotation. In still other embodiments, treatment apparatus 10 may comprise a combination of driven and undriven conveyance rollers 28. While conveyance rollers 28 are shown as positioned beneath substrate 12 and thereby supporting substrate 12 on first major surface 14, in further embodiments, additional conveyance rollers 28 may be positioned above substrate 12 and contact second major surface 16. For example, upper conveyance rollers contacting second major surface 16 may be driven rollers that propel substrate 12 in conveyance direction 20 over lower conveyance rollers that are undriven. In some embodiments, one or more pairs of conveyance rollers may be configured to extend partially in a direction orthogonal to conveyance direction 20. For example, in some embodiments, conveyance rollers, such as upper conveyance rollers contacting second major surface 16 (not shown), may contact edge portions of substrate 12 and not contact central portions of the first and/or second major surfaces.

Figure 3A:
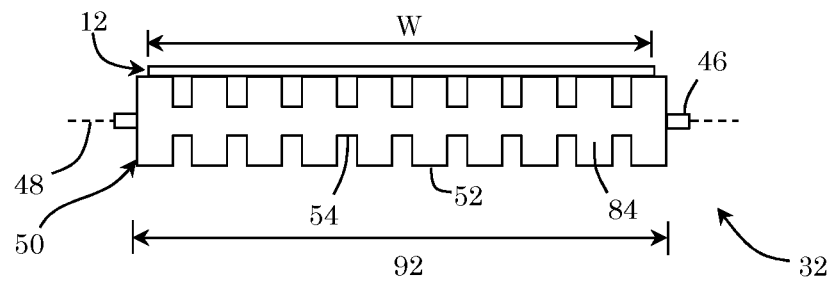
FIG. 3A is a side view of an exemplary roller that can be used to apply a masking material in the treatment apparatus of FIGS. 1 and 2.
Figure 3B:
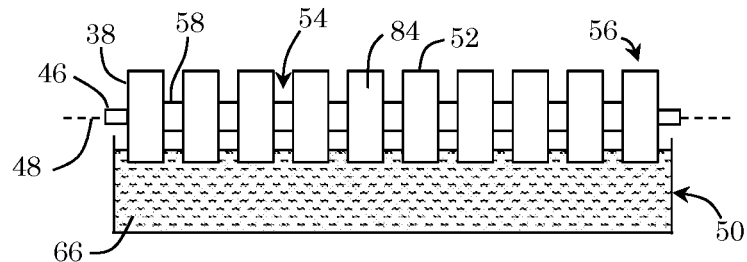
FIG. 3B is a cross-sectional side view showing the roller of FIG. 3A at least partially immersed in a masking material.

Still referring to FIGS. 1 and 2, masking roller 32 can be positioned along conveyance path 30 in a manner similar to conveyance rollers 28. Accordingly, masking roller 32 can extend across width 90 of substrate 12 in a direction orthogonal to conveyance direction 20, wherein a length 92 of masking roller 32 can be equal to or greater than width 90 of substrate 12. However, length 92 of masking roller 32 can be less than width 90 of substrate 12 if less than the full surface area of the substrate is to be treated. As shown in FIG. 3A, masking roller 32 can comprise a shaft 46 with a longitudinal axis (e.g., axis of rotation) 48 and a roller body 50 comprising a plurality of ridges 52 separated by grooves 54. That is, ridges 52 and grooves 54 can alternate in a length direction of the masking roller parallel with longitudinal axis 48. Longitudinal axis 48, which is an axis of rotation, can be arranged orthogonal to conveyance direction 20. In some embodiments, masking roller 32 may be of unitary construction, wherein roller body 50 is a single roller body, either as originally formed, or by comprising multiple parts securely joined, such as shown in FIG. 3A. Thus, in some embodiments, roller body 50 may be joined with shaft 46, wherein shaft 46 and roller body 50 are rotatable together about axis of rotation 48. In other embodiments, as shown in FIG. 3B, masking roller 32 may comprise a plurality of wheels 56 positioned on shaft 46 and spaced apart, either by protuberances on the wheels 56 (not shown) or by spacers 58 alternately placed between wheels 56, wherein a diameter of the spacers in a direction orthogonal to axis of rotation 48 is less than a diameter of the wheels. In such embodiments, wheels 56 form the ridges 52 and spacers 58 form the grooves 54. In some embodiments, wheels 56 may be independently rotatable on shaft 46 about axis of rotation 48, wherein a wheel 56 can rotate independently of another wheel 56. In such embodiments, shaft 46 may be stationary while the wheels, and optionally the spacers, rotate, although in further embodiments, shaft 46 and wheels 56 may be individually freely rotatable about axis of rotation 48.

In some embodiments, masking roller 32 can be a driven roller, wherein the masking roller, e.g., shaft 46, is coupled to a motor (not shown) that rotates the masking roller about axis of rotation 48, while in further embodiments, masking roller 32 can be un-driven and freely rotatable. In some embodiments, masking roller 32 may be coupled to conveyance rollers 28. For example, treatment apparatus 10 may comprise a drive mechanism configured to simultaneously rotate conveyance rollers 28 and masking roller 32. That is, in some embodiments, rotation of masking roller 32 can be synchronized with rotation of conveyance rollers 28 so masking roller 32 rotates at the same rotation speed as conveyance rollers 28, which may aid in movement of substrate 12 in conveyance direction 20. For example, in some embodiments, conveyance rollers 28 and masking roller 32 can be driven by a chain, such as via gears coupled to respective shafts, the chain coupled to a motor that drives the chain and thereby rotates conveyance rollers 28 and masking roller 32, while in further embodiments, conveyance rollers 28 and/or masking roller 32 can be entirely driven by gears. In still other embodiments, conveyance rollers 28 and/or masking roller 32 can be rotated by one or more belts coupled to a motor or motors. Other conveyance methods as are known in the art may be used in addition or in the alternative. In some embodiments, treatment apparatus 10 may comprise a single masking roller 32, although in further embodiments, treatment apparatus 10 may comprise a plurality of masking rollers 32.

Roller body 50 (or wheels 56) may comprise a plurality of layers, for example concentric layers. In some embodiments, roller body 50 can comprise an outer layer formed of polyvinyl chloride (PVC), although other materials can be used that provide easy machinability, easy wetting when contacted with an etch resistant polymer, and rigidity.

Figure 3C:
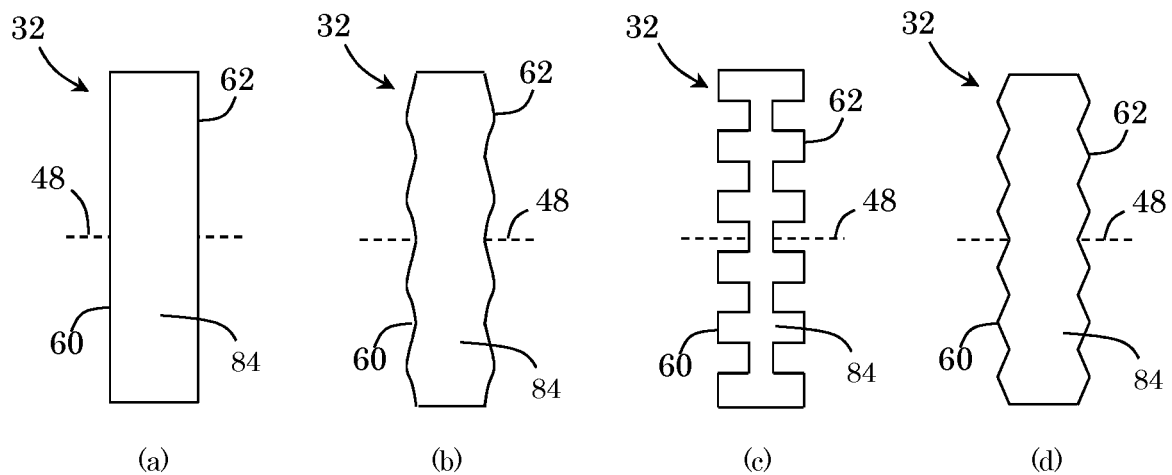
FIG. 3C illustrates various exemplary configurations for the roller of FIGS. 3A and 3B.

Although masking roller 32 is shown in FIGS. 3A and 3B comprising a plurality of ridges formed by right cylindrical sections comprising peripheral surfaces 84 defined between opposing circular edges, ridges 52 can have other peripheral surface shapes. For example, ridges 52 can comprise peripheral surfaces with wavy edges, peripheral surfaces with parallel edges (i.e., defined between the perimeters of two circles having the same diameter lying in parallel planes with respective centers lying on the same line orthogonal to the parallel planes), peripheral surfaces with zig-zag or sawtooth edges, or any other curvilinear edge design, regular or irregular. The opposing edges of such surface shapes need not be symmetric. FIG. 3C illustrates four example peripheral surface edge patterns defined between side edges 60, 62 of a ridge: (a) circular edges, (b) wavy edges, (c) square-wave-like edges, and (d) zigzag (sawtooth) edges. Other peripheral surface patterns are possible and contemplated.

Masking roller 32 can be rotatable about axis of rotation 48 and mounted via shaft 46 over first container 34 such that at least the peripheral surfaces 84 of ridges 52 are in contact with, for example immersed in, masking material 66 contained in first container 34. Masking material 66 can comprise any suitable masking material easily applied as a liquid and removed by a selected etchant. For example, in some embodiments, masking material 66 can comprise styrene maleic acid (SMA), although in further embodiments, other masking materials may be used, for example acrylates, novolac (a phenol-formaldehyde resin with a formaldehyde-to-phenol molar ratio of less than 1), or silicones.

Treatment apparatus 10 may further comprise an etchant roller 36 positioned along conveyance path 30. In some embodiments, treatment apparatus 10 may comprise a single etchant roller 36, although in further embodiments, treatment apparatus 10 may comprise a plurality of etchant rollers 36. Etchant roller 36 can be rotatably mounted and rotatable about axis of rotation 64. Etchant roller 36 is positioned downstream of masking roller 32 relative to conveyance direction 20, wherein substrate 12 traveling along conveyance path 30 in conveyance direction 20 encounters etchant roller 36 after encountering masking roller 32.

Figure 4A:
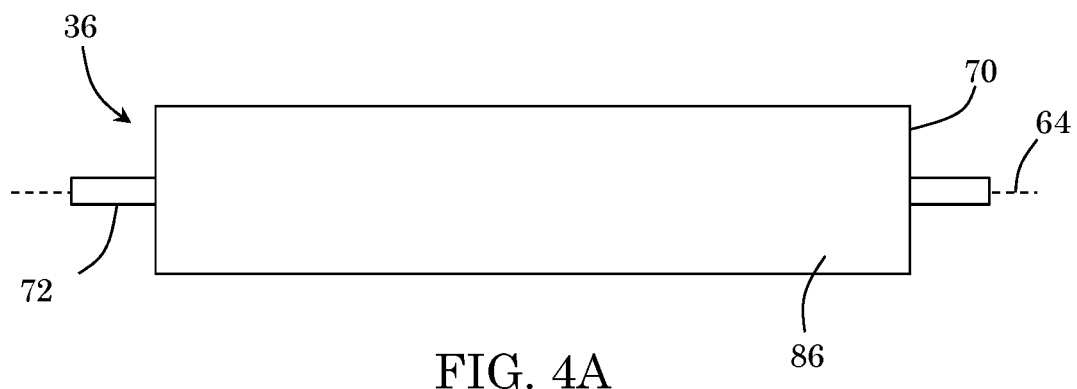
FIG. 4A is a side view of an exemplary roller for applying an etchant with the treatment apparatus of FIGS. 1 and 2.
Figure 4B:
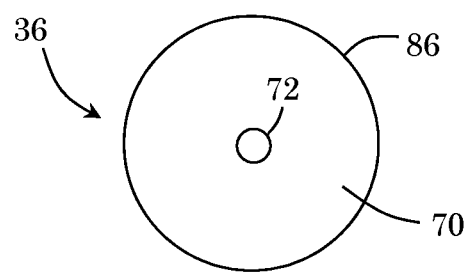
FIG. 4B a cross-sectional view of a roller according to FIG. 4A comprising a homogeneous body and a shaft extending therethrough.
Figure 4C:
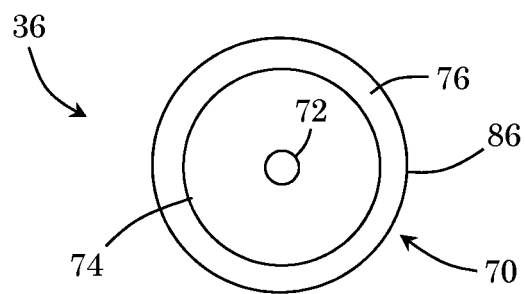
FIG. 4C is a cross-sectional view of a roller according to FIG. 4A comprising a body and a shaft extending therethrough, the body comprising an outer layer positioned around a periphery thereof.

In some embodiments, shown in FIGS. 4A and 4B, etchant roller 36 may comprise a monolithic roller body 70 of continuous (e.g., homogeneous) composition mounted on a shaft 72. However, in further embodiments, roller body 70 may be non-homogeneous. In some embodiments, roller body 70 can comprise a plurality of layers, such as concentric layers. For example, as shown in FIG. 4C, roller body 70 can include a core 74 coupled to shaft 72, and an outer layer 76 defining an outer surface 86 of etchant roller 36 positioned on and coupled to core 74. Etchant roller 36 may further include one or more intermediate layers between core 74 and outer layer 76. Core 74 can comprise a solid core, although a hollow or partially hollow inner core may be provided in further embodiments. Core 74 can facilitate transfer of torque from a motor coupled to shaft 72 to outer layer 76 to rotate etchant roller 36 about axis of rotation 64, while outer layer 76 can be fabricated of material designed to provide desired lifting of etchant 78 from second container 38 and coating of the etchant on first major surface 14 of substrate 12 as substrate 12 traverses over etchant roller 36. For example, etchant roller 36 can comprise an outer layer 76 comprising a foam material. Outer layer 76 may include, for example, an open porous network of etchant-resistant material, such as a polyurethane or a polyolefin material.

Like masking roller 32, etchant roller 36 can extend across all or a portion of width 90 of substrate 12 in a direction orthogonal to conveyance direction 20. That is, axis of rotation 64 of etchant roller 36 can be orthogonal to conveyance direction 20. In embodiments, etchant roller 36 can be rotatably mounted over second container 38 such that peripheral surface 86 of etchant roller 36 is in contact with, for example immersed in, etchant 78 contained in second container 38. In various embodiments, etchant 78 can comprise hydrofluoric acid (HF), although in further embodiments, other suitable etchants can be used depending on the material of substrate 12. In examples described herein, etchant 78 comprised 1 molar (M) concentration of $H_3PO_4$+ 0.35M NaF at 40° C. However, other suitable etchants may be used depending on substrate material. HF-based etching of glass, for example, is initially time dependent, where achievable average roughness Ra values eventually saturate at about 0.5 nm. The resulting surface texture of the treated substrate 12 can be on the nanometer scale, both in height as well as laterally, with correlation lengths also on the order of nanometers.

Figure 5:
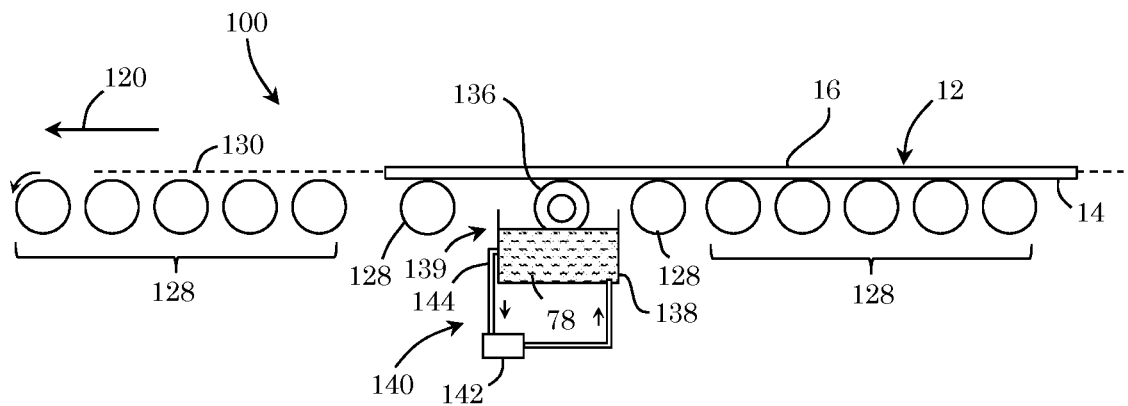
FIG. 5 is a cross-sectional side view of another exemplary treatment apparatus for treating a substrate in accordance with embodiments of the present disclosure.
Figure 6:
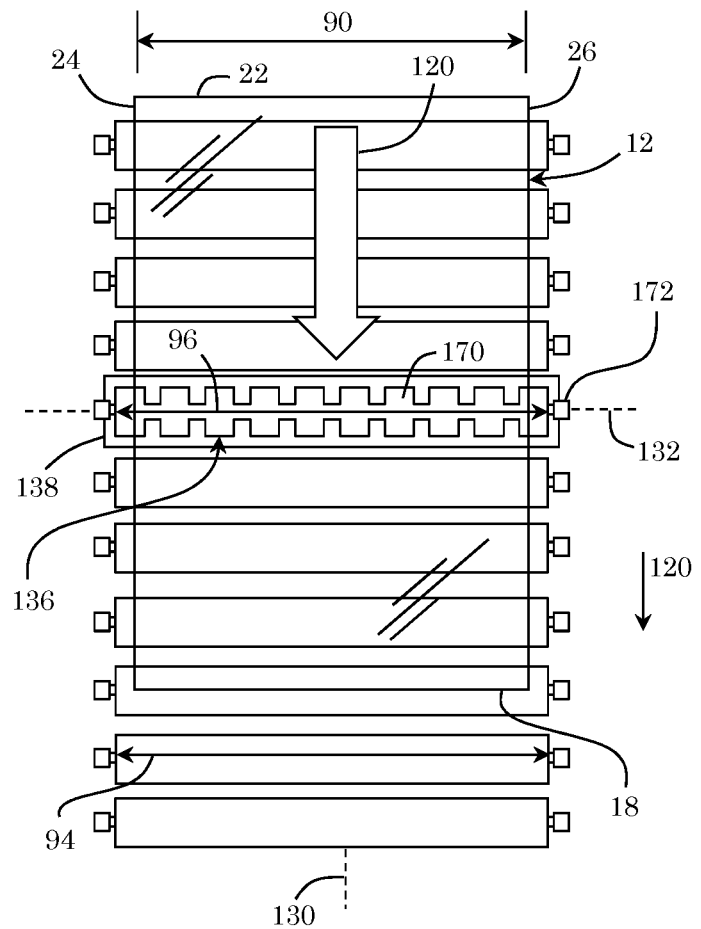
FIG. 6 is a top view of the treatment apparatus of FIG. 5.

FIGS. 5 and 6 depict an embodiment of another exemplary treatment apparatus 100 comprising a plurality of conveyance rollers 128 configured to convey substrate 12 in conveyance direction 120 along conveyance path 130, an etchant roller 136, and a container 138 forming etchant reservoir 139. Treatment apparatus 100 may further comprise an etchant circulation system 140 in fluid communication with etchant reservoir 139 and configured to circulate etchant through container 138 via pump 142 and piping 144.

Conveyance rollers 128 can be full-length rollers, wherein a length 94 of the conveyance rollers in a direction orthogonal to conveyance direction 120 can be equal to or greater than width 90 defined between first and second side edges 24, 26 of substrate 12 (see FIG. 6). Conveyance rollers 128 can be driven rollers. For example, conveyance rollers 128 can be coupled to a motor (not shown) that rotates the conveyance rollers 128 about respective axes of rotation to convey substrate 12 in conveyance direction 120 along conveyance path 130. In other embodiments, conveyance rollers 128 may be non-driven and individually freely rotatable. In still other embodiments, treatment apparatus 100 may comprise a combination of driven and un-driven conveyance rollers 128. While conveyance rollers 128 are shown positioned beneath substrate 12 and thereby supporting substrate 12 on first major surface 14, in further embodiments, additional conveyance rollers 128 may be positioned above substrate 12 and contact second major surface 16. For example, upper conveyance rollers contacting second major surface 16 may be driven rollers that propel substrate 12 in conveyance direction 120. In some embodiments, one or more pairs of conveyance rollers may be configured to extend partially in a direction orthogonal to conveyance direction 20. For example, in some embodiments, conveyance rollers may contact edge portions of second major surface 16 but not central portions of second major surface 16.

Figure 7A:
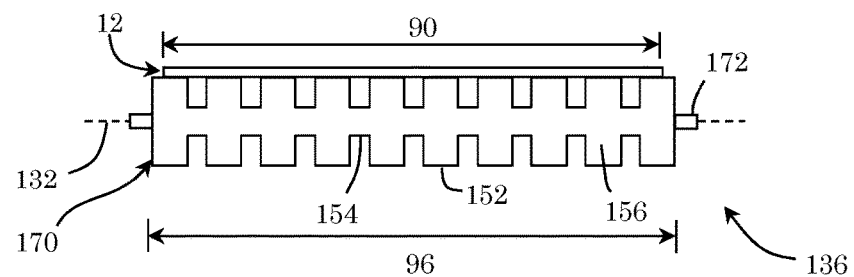
FIG. 7A is a side view of an exemplary roller that can be used to apply an etchant in the treatment apparatus of FIGS. 5 and 6.
Figure 7B:
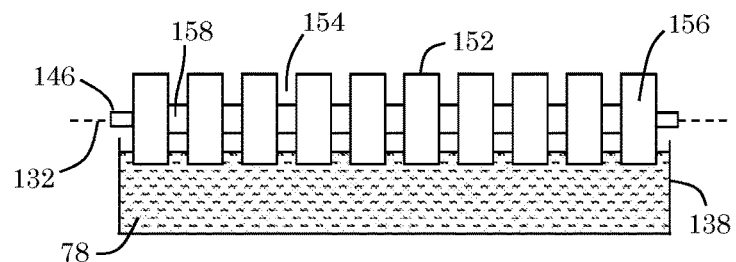
FIG. 7B is a cross-sectional view showing the roller of FIG. 7A at least partially immersed the etchant.

In embodiments, treatment apparatus 100 may further comprise an etchant roller 136 configured to rotate around axis of rotation 132, although in further embodiments, treatment apparatus 100 may comprise a plurality of etchant rollers 136. Etchant roller 136 can extend across width 90 of substrate 12 in a direction orthogonal to conveyance direction 120 (e.g., axis of rotation 132 is orthogonal to conveyance direction 120), wherein a length 96 of etchant roller 136 can be equal to or greater than width 90 of substrate 12. However, in further embodiments, length 96 may be less than width 90 if less than the full width of substrate 12 is to be treated. As shown in FIGS. 7A and 7B, etchant roller 136 can comprise a shaft 172 and a roller body 170 comprising a plurality of ridges 152 separated by grooves 154. That is, ridges 152 and grooves 154 alternate in a longitudinal direction of etchant roller 136, along axis of rotation 132.

Figure 7C:
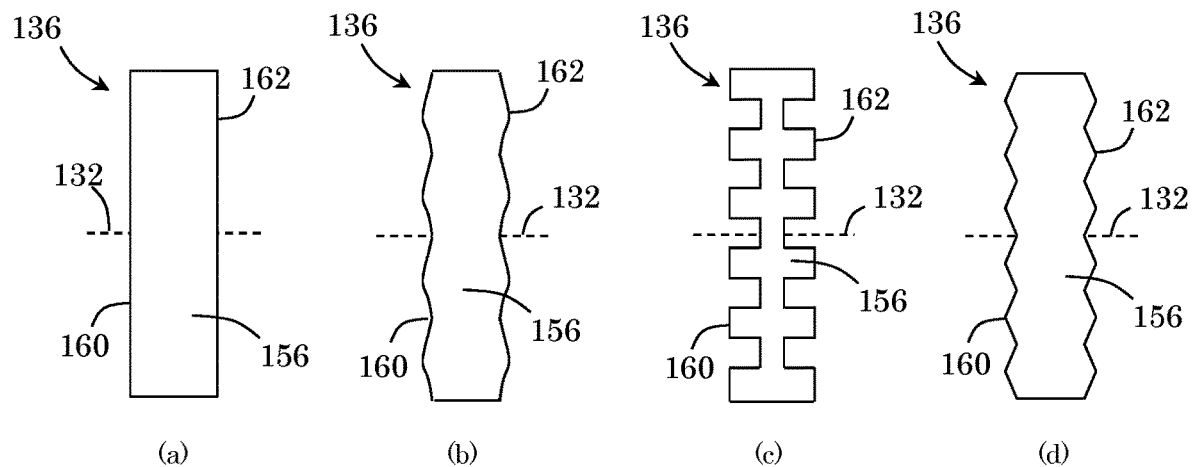
FIG. 7C illustrates various exemplary configurations for ridge surfaces of the roller of FIGS. 7A and 7B.

Although etchant roller 136 is shown in FIGS. 7A and 7B comprising a plurality of ridges formed by right cylindrical sections comprising peripheral surfaces 156 defined between opposing circular edges, ridges 152 could have other peripheral surface shapes. For example, ridges 152 could comprise peripheral surfaces with wavy edges, peripheral surfaces with parallel edges (i.e., defined between the perimeters of two circles having the same diameter lying in parallel planes with respective centers lying on the same line orthogonal to the parallel planes), peripheral surfaces with zig-zag or sawtooth edges, or any other curvilinear peripheral surface shapes. The opposing edges of such surface shapes need not be symmetric. FIG. 7C illustrates four example peripheral surface patterns defined between side edges 160, 162 of a ridge: (a) circular edges, (b) wavy edges, (c) square-wave-like edges, and (d) zigzag (sawtooth) edges. Other peripheral surface patterns are possible and contemplated.

Figure 8A:
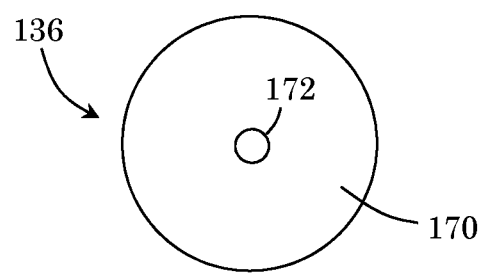
FIG. 8A is a cross-sectional view of a roller comprising a homogeneous body and a shaft extending therethrough.
Figure 8B:
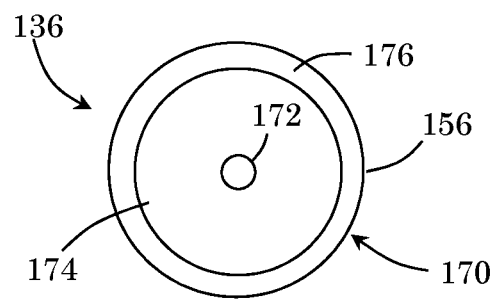
FIG. 8B is a cross-sectional view of a roller comprising a body and a shaft extending therethrough, the body comprising an outer layer positioned around a periphery thereof.

In some embodiments, as shown in FIG. 8A, etchant roller 136 may comprise a monolithic roller body 170 of continuous (e.g., homogeneous) composition mounted on a shaft 172. However, in further embodiments, etchant roller body 170 may comprises a plurality of layers, for example concentric layers, such as shown in FIG. 8B. Accordingly, etchant roller body 170 can include a core 174 coupled to shaft 172, and an outer layer 176 defining outer periphery of etchant roller 136 (e.g., an outer periphery of ridges 152) positioned on core 174. While not shown, etchant roller 136 may further include one or more intermediate layers positioned between core 174 and outer layer 176. Core 174 can comprise a solid core, although a hollow or partially hollow inner core may be provided in further embodiments. Core 174 can facilitate transfer of torque from a motor coupled to shaft 172 to outer layer 176 to rotate etchant roller 136, while outer layer 176 can be fabricated of material designed to provide desired lifting of etchant 178 from container 138 and coating of the etchant on first major surface 14 of substrate 12. For example, etchant roller 136 can comprise an outer layer 176 comprising a foam material. Outer layer 176 may comprise, for example, an open porous network of an etchant-resistant polymer material, such as a polyurethane or a polyolefin material.

In some embodiments, etchant roller 136 can be a driven roller, wherein etchant roller 136 can be coupled to a motor (not shown) that rotates the etchant roller about axis of rotation 132, while in further embodiments, etchant roller 136 can be un-driven and freely rotatable about axis of rotation 132. In some embodiments, etchant roller 136 may be coupled to conveyance rollers 128. For example, treatment apparatus 100 may comprise a drive mechanism configured to simultaneously rotate conveyance rollers 128 and etchant roller 136. That is, in some embodiments, rotation of etchant roller 136 about axis of rotation 132 can be synchronized with the rotation of conveyance rollers 128 so that etchant roller 136 rotates at the same rotation speed as conveyance rollers 128. For example, in some embodiments, conveyance rollers 128 and etchant roller 136 can be driven by a chain, the chain coupled to a motor that drives the chain and thereby rotates conveyance rollers 128 and etchant roller 136.

In some embodiments, ridges 152 may be evenly spaced along etchant roller 136. For example, the spacing pattern may be dictated by a desired performance attribute of the substrate 12 after treatment. Accordingly, in some embodiments, the ridges may not be evenly spaced, or individual ridges of the plurality of ridges may have different peripheral surface widths in a direction orthogonal to the conveyance direction.

Etchant roller 136 can be rotatably mounted via shaft 172 over container 138 such that at least peripheral surfaces 156 of ridges 152 are in contact with, for example immersed in, etchant 78 contained within container 138.

Unlike treatment apparatus 10, a masking roller is unnecessary for the embodiment of treatment apparatus 100, and the functional benefit provided by masking roller 32 in treatment apparatus 10 is performed by etchant roller 136 in treatment apparatus 100. That is, rather than using a masking material to prevent immediate attack of a substrate surface by etchant 78, the etchant is applied to substrate first major surface 14 in a predetermined pattern by patterned etchant roller 136. Etching of the substrate major surface occurs most readily on those surface portions to which the etchant is immediately applied by etchant roller 136 and attacks those portions of the substrate surface to which the etchant is not directly applied by the etchant roller due to subsequent spreading of the etchant on the substrate surface. As a result, those portions of the substrate major surface to which the etchant is directly applied by etchant roller 136 are etched more than those surface portions etched because of etchant spreading.

In accordance with methods of the present disclosure, substrate 12 can be conveyed adjacent to, e.g., over, etchant roller 36, for example by conveyance rollers 28. In the embodiment of treatment apparatus 10, first major surface 14 of substrate 12 is spaced above a free surface of masking material 66 and faces the free surface. The method can further include rotating masking roller 32 about axis of rotation 48 to transfer masking material 66 from first container 34 to first major surface 14 of substrate 12 as substrate 12 is conveyed in conveyance direction 20 along conveyance path 30. For example, masking roller 32 can rotate in a direction suitable to promote translation of substrate 12 in conveyance direction 20 while lifting masking material 66 from first container 34 to contact and thereby coat first major surface 14 of substrate 12 with a layer of masking material 66.

Figure 9:
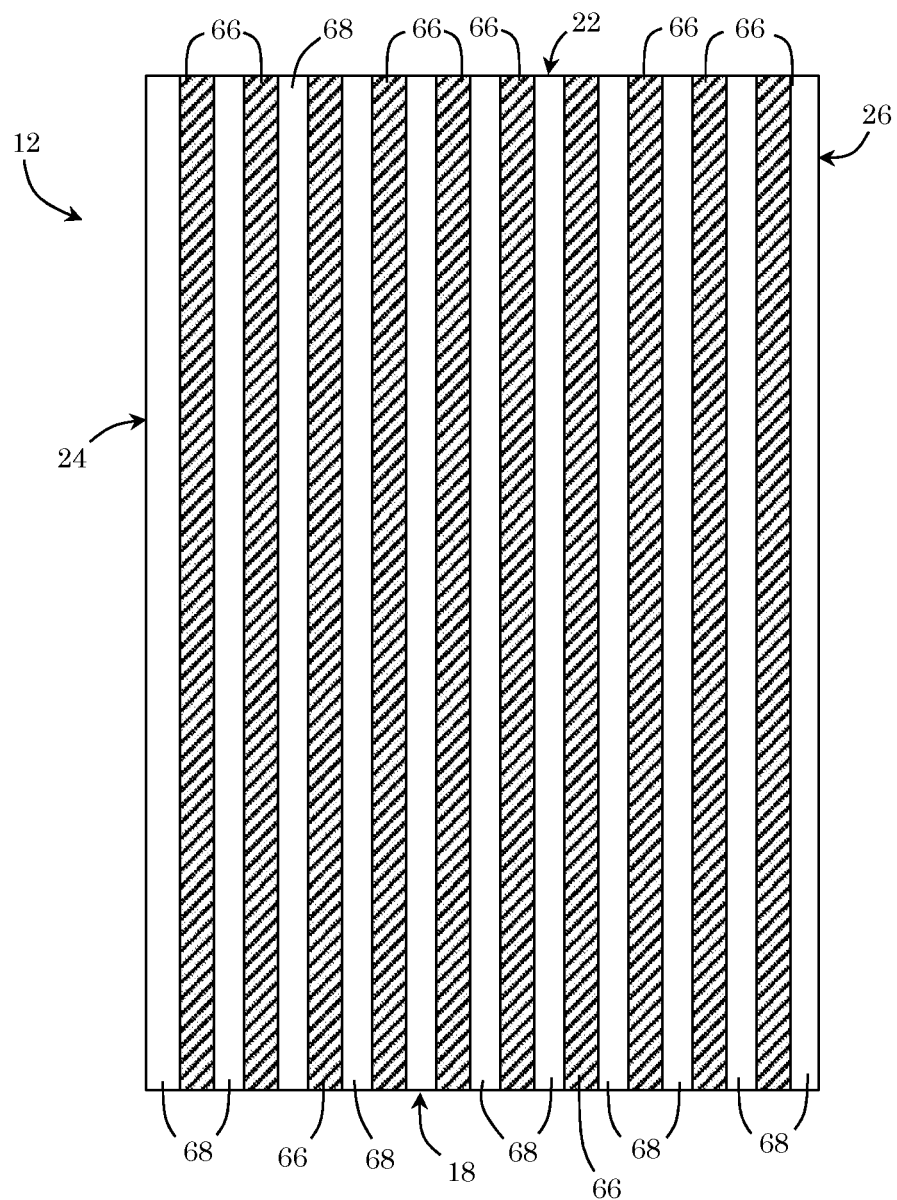
FIG. 9 is a schematic view of a surface of a substrate treated with the apparatus of FIG. 1 showing alternating regions (e.g., stripes) coated with a masking material and uncoated.

As masking roller 32 rotates, masking material 66 is applied to first major surface 14 of substrate 12 in a predetermined pattern defined by ridges 52 as substrate 12 is conveyed in conveyance direction 20 along conveyance path 30. For example, in embodiments where ridge surfaces defined between two parallel circular edges (e.g., see FIG. 3C(a)), masking roller 32 is configured to deposit parallel rows of masking material 66 on first major surface 14 such that first major surface 14 comprises alternating parallel rows of masking material 66, e.g., rows coated with masking material 66 and intervening uncoated rows 68 (see FIG. 9).

As substrate 12 is conveyed forward along conveyance path 30 in conveyance direction 20, first major surface 14, now coated with masking material 66 in a predetermined pattern, passes over etchant roller 36. As etchant roller 36 rotates, etchant 78 is applied to first major surface 14 of substrate 12, e.g., over rows of masking material 66 and rows 68 not coated with masking material 66, for example the entire first major surface 14.

Figure 10A:
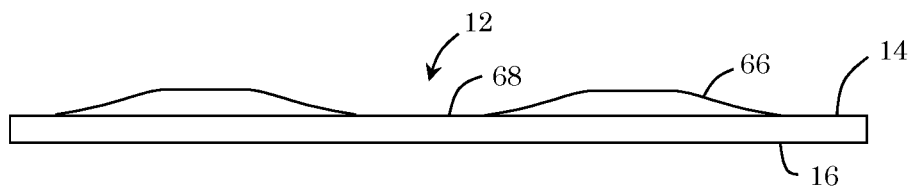
FIG. 10A-10D are a sequence of schematic illustrations showing the gradual dissolution of substrate material and masking material from a substrate coated with a masking material and then exposed to an etchant.
Figure 10B:
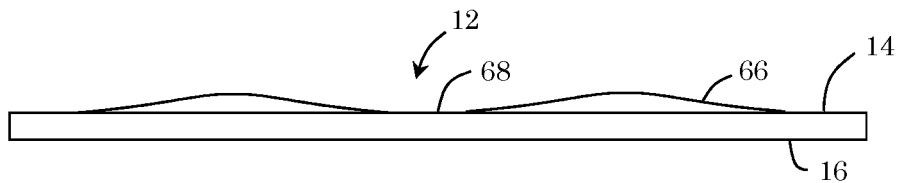
Figure 10C:
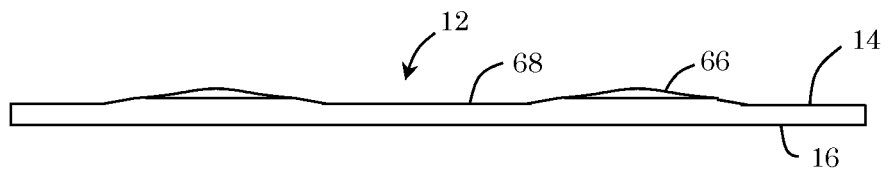
Figure 10D:
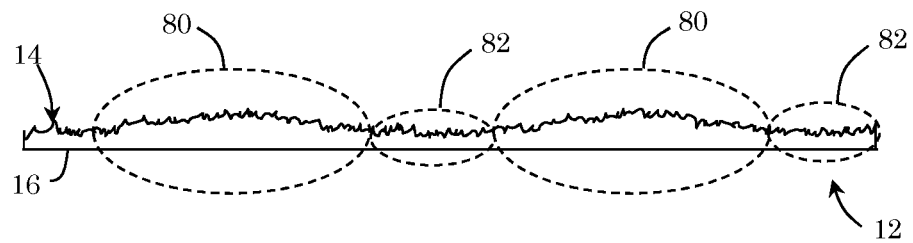

Referring now to FIGS. 10A-10D, a sequence of cross-sectional profiles of substrate 12 viewed in cross-section across width 90 are provided, illustrating removal of substrate material from first major surface 14 at rows 68 not coated with masking material and removal of rows of masking material 66. As the sequence shows, material removal over the uncoated portions of substrate 12 begins rapidly after coating with etchant 78 while portions of the substrate coated with masking material 66 are initially protected by the masking material. At FIG. 10A, rows of masking material 66 have been applied to first major surface 14. At FIG. 10B to FIG. 10C, masking material is removed by etchant 78 allowing etchant 78 to attack an increasingly larger surface area of first major surface 14. However, because material removal of the area under masking material 66 was delayed by the presence of the masking material, substrate material removal is less where the masking material was deposited on first major surface 14 than at the initially uncoated locations, e.g., rows (surfaces) 68 not coated with masking material. Eventually, as depicted in FIG. 10D, masking material 66 can be entirely removed from first major surface 14 and etchant 78 attacks and begins to remove material from the areas of first major surface 14 previously coated with masking material 66. In some instances, removal of masking material 66 can be rapid, taking only seconds for the masking material to be removed. Regardless, the result is a substrate comprising a surface comprising a plurality of raised regions 80 and a plurality of depressed or valley regions 82 that alternate across first major surface 14. That is, after etching with etchant 78, first major surface 14 can comprise a low-frequency undulation of peaks and valleys representing thickness variations of the substrate, wherein a thickness of valley regions is less than a thickness of peak regions. As used herein, the term "thickness" refers to the distance between major surfaces of substrate 12, nominally in a direction orthogonal to at least one of the first or second major surfaces (e.g., prior to etching). In addition, both the raised regions and the depressed regions may further comprise a fine, generally isotropic texture resulting from the overall etching action of the etchant over first major surface 14. Accordingly, first major surface 14, after etching in accordance with the present disclosure, can comprise a first, low-frequency macro-scale anisotropic texture resulting from the combination of masked and unmasked areas of the etched substrate surface. The substrate may further comprise a fine, high-frequency isotropic surface texture imposed on both the initially masked areas and the unmasked areas, the anisotropic texture comprising a peak-to-peak period and a magnitude while the isotropic texture is best-characterized by an average surface roughness Sa equal to or less than about 1 nanometer and which texture extends over the entire surface of the substrate to which the etchant was applied and is uniform regardless direction across the surface.

Figure 11:
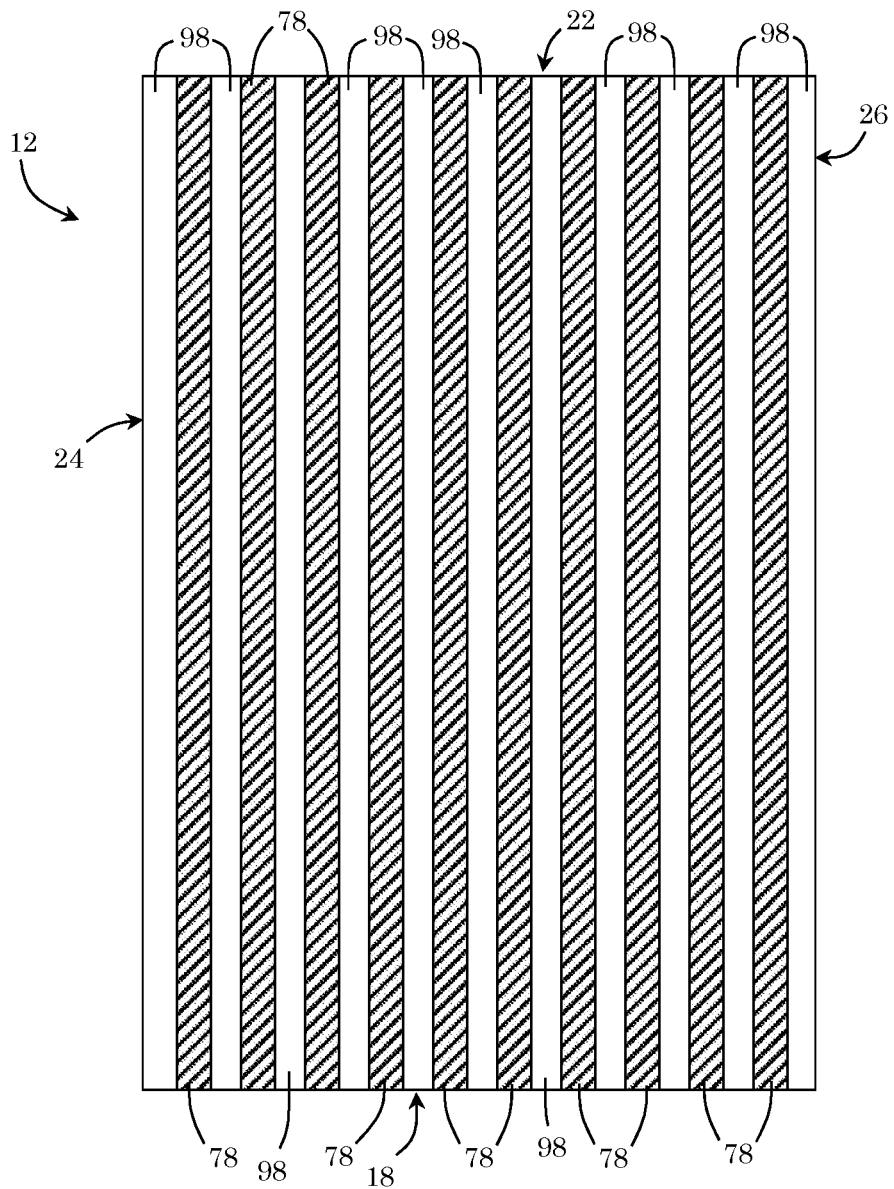
FIG. 11 is a schematic view of a surface of a substrate treated with the apparatus of FIG. 5 showing alternating regions (e.g., stripes) of the substrate coated with an etchant and uncoated by the etchant.
Figure 12A:
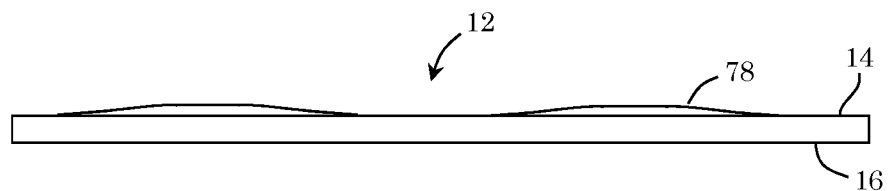
FIG. 12A-12D are a sequence of schematic illustrations showing the gradual dissolution of substrate material and masking material from a substrate coated exposed to pattern-applied etchant.
Figure 12B:
Figure 12C:
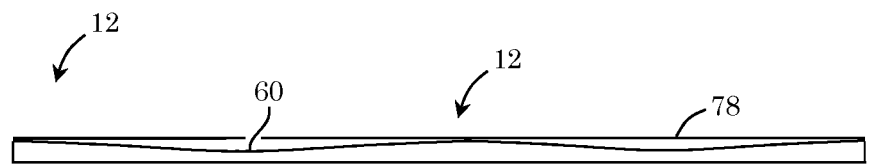
Figure 12D:
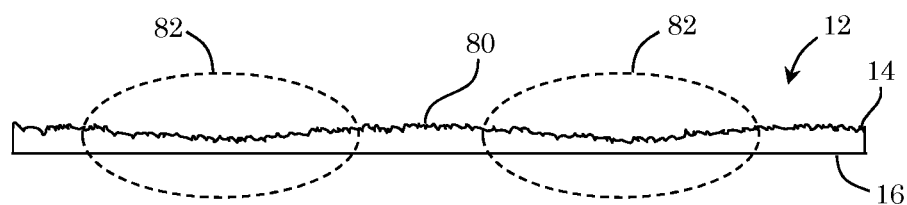

In another embodiment, a similar method can be used for the embodiment of treatment apparatus 100, except instead of etchant 78 being applied uniformly across the surface of the substrate and a masking material retarding immediate etching of the surface in predetermined areas of the surface as described in reference to the embodiment of treatment apparatus 10, in accordance with the embodiment of treatment apparatus 100, etchant 78 can be applied selectively to first major surface 14 of substrate 12, whereby certain regions of the substrate where etchant 78 are directly applied are etched more rapidly than other areas of the substrate where the etchant was not directly applied. That is, rows of etchant-coated portions of first major surface 14 are separated by rows 98 of uncoated surface portions (see FIG. 11). As shown in FIG. 12A, etchant 78 is applied to first major surface 14 in parallel rows and begins removing material from first major surface 14 of substrate 12. At FIG. 12B, the etchant begins spreading, and material removal extends beyond the original etchant application areas. Progressively more material removal is shown at FIG. 12C, illustrating more material removal in regions where the etchant was originally applied than in regions where the etchant later spread. At FIG. 12D, the etchant has created raised areas 80 and valley regions 82, the depressed regions related to those locations where the etchant was originally applied. Accordingly, first major surface 14, after etching in accordance with the present disclosure, can comprise a first, low-frequency macro-scale anisotropic texture. The substrate may further comprise a fine, high-frequency isotropic surface texture imposed over the entire major surface of the substrate that was in contact with the etchant. The anisotropic texture comprises a peak-to-peak period and a magnitude while the isotropic texture is best-characterized by an average surface roughness Sa equal to or less than about 1 nm and which isotropic texture extends over the entire surface of the substrate to which the etchant was applied and is uniform regardless the direction in which characterization occurs.

Figure 13:
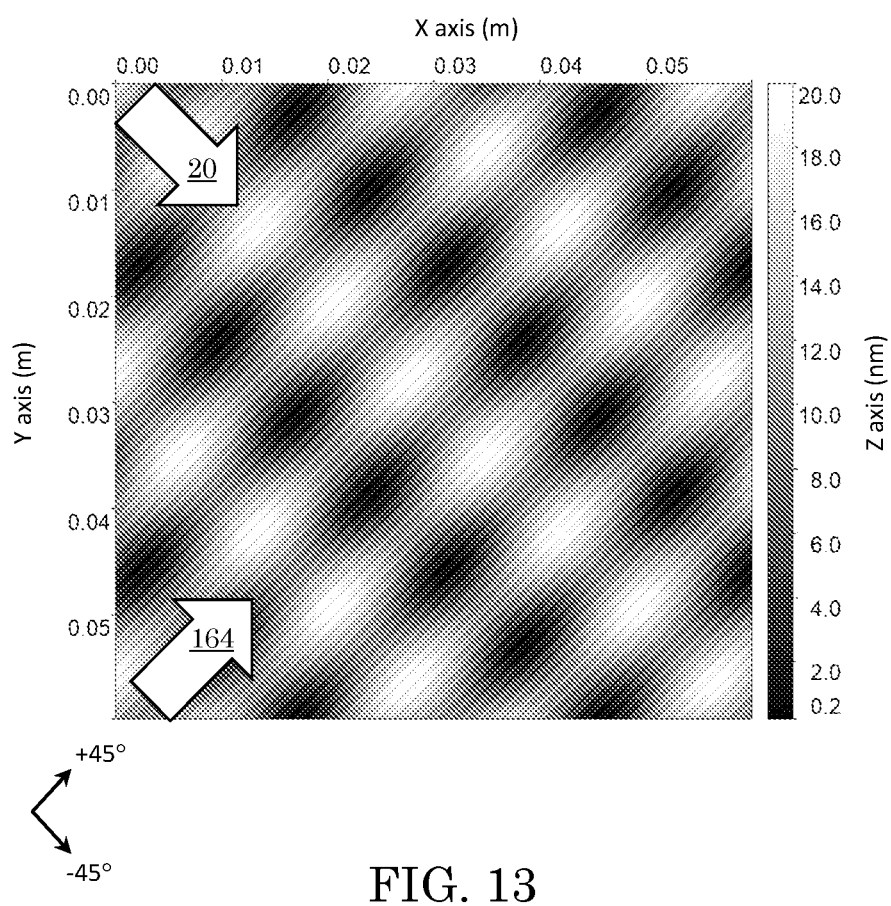
FIG. 13 is a computer-generated optical facsimile of a substrate surface comprising three co-located textures.
Figure 14:
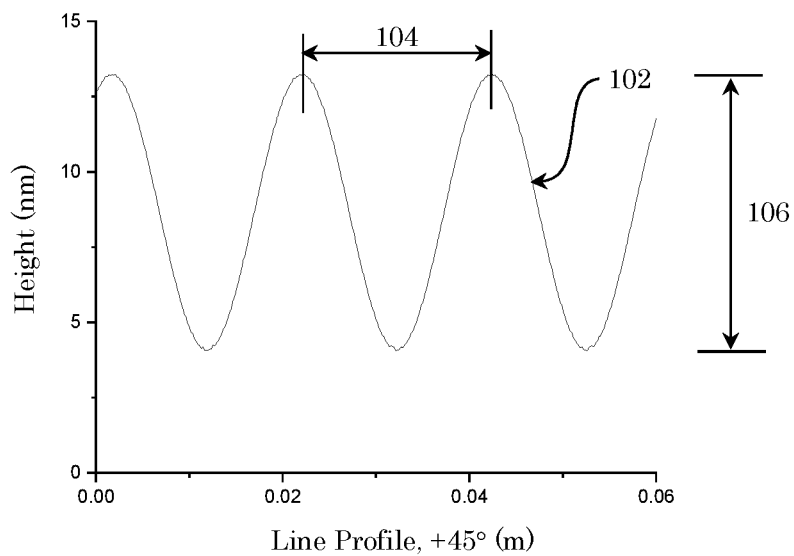
FIG. 14 is a plot showing a surface texture line profile for one of the textures of FIG. 13.

The treated substrate resulting from methods applied by either treatment apparatus 10 or treatment apparatus 100 can comprise a first texture. By way of example, FIG. 13 illustrates a computer-simulated optical view of textured substrate surface (e.g., as might be imaged through an optical instrument, e.g., microscope) comprising the first texture as obtained from treatment apparatus 10 or treatment apparatus 100. The first texture can be an anisotropic texture comprising a direction (wherein the direction is along an axis orthogonal to a line of a ridge, e.g., the ridge resembling a wavefront), as indicated by the large white arrow 164, that extends orthogonal to the conveyance direction 20 of substrate 12, and hence masking roller 32 (or etchant roller 136), here indicated as −45°. Thus, the direction of the first texture extends in the indicated +45° direction and is continuous along an axis parallel with the axis of rotation 48 of masking roller 32 in the embodiment of treatment apparatus 10, or axis of rotation 132 of etchant roller 136 in the embodiment of treatment apparatus 100. The first texture, e.g., texture 102 related directly to the spaced-apart plurality of ridges, is illustrated in the plot of FIG. 14, wherein the first texture comprises, in this example, a sinusoidal wave pattern. However, the first texture need not exhibit a sinusoidal pattern, but could exhibit other patterns depending on the configuration of the masking or etching roller ridges (e.g., treatment apparatus 10 or treatment apparatus 100). Referring to FIG. 14, the first texture can have a peak-to-peak period 104 in a range from about 0.1 millimeters to about 100 millimeters, for example in a range from about 1 millimeter to about 75 millimeters. First texture 102 can have a peak-to-valley magnitude 106 in a range from about 2 nanometers to about 100 nanometers.

Substrate 12 may comprise a second, isotropic texture resulting from the overall action of the etchant on the exposed first major surface 14 of substrate 12 and, as described above, can comprise a uniform characteristic regardless of direction, i.e., an isotropic texture. For example, the second texture can exhibit an average surface roughness Sa equal to or less than about 1 nm as measured by atomic force microscopy (AFM).

In some embodiments, first major surface 14 may comprise a third texture 108 co-located with first texture 102. Third texture 108 can be a low-frequency texture, shown in FIG. 15 as a sinusoidal texture, although, like first texture 102, third texture 108 need not be sinusoidal. Third texture 108 can have a peak-to-peak wavelength 110 in a range from about 0.1 micrometers to about 25 micrometers. Third texture 108 can have a peak-to-valley magnitude 112 in a range from about 2 nanometers to about 50 micrometers. Third texture 108 can result, for example, from a motion of substrate 12 not directly related to linear motion of the substrate in conveyance direction 20 (120). That is, traverse of the substrate in the conveyance direction over the conveyance rollers can cause subsequent ancillary motion of the substrate, for example a rocking motion, that can produce third texture 108. Accordingly, third texture 108 can extend in the −45° direction such that a line extending perpendicular to successive wave fronts of third texture 108 is parallel with conveyance direction 20 (120).

Figure 15:
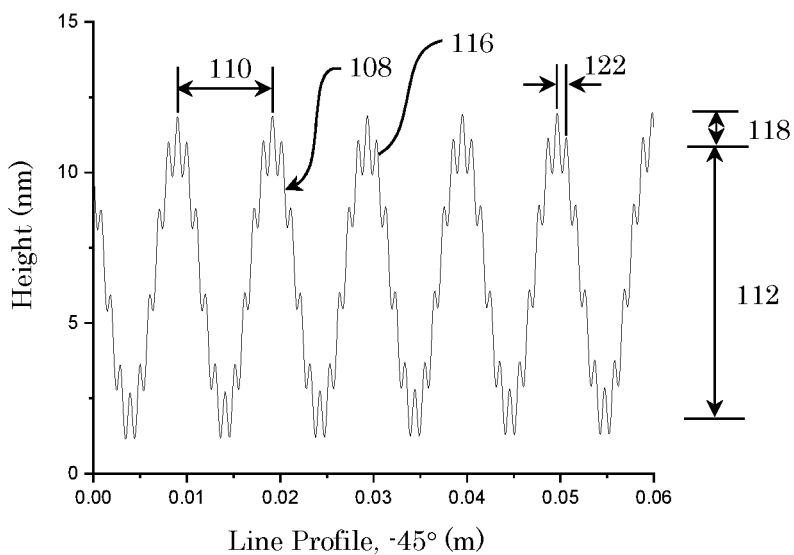
FIG. 15 is a plot showing a surface texture line profile for two of the textures of FIG. 13.

In some embodiments, first major surface 14 can comprise a fourth texture 118, shown as a high-frequency texture co-located with third texture 108 in FIG. 15. It is believed fluid dynamics related to the etchant transfer from the etchant reservoir to the etchant rollers, and/or from the etchant rollers to first major surface 14 of substrate 12, can produce additional fourth texture 118. Fourth texture 118 can have a peak-to-peak period 122 of about 0.1 nanometers to about 2 nanometers.

Figure 16:
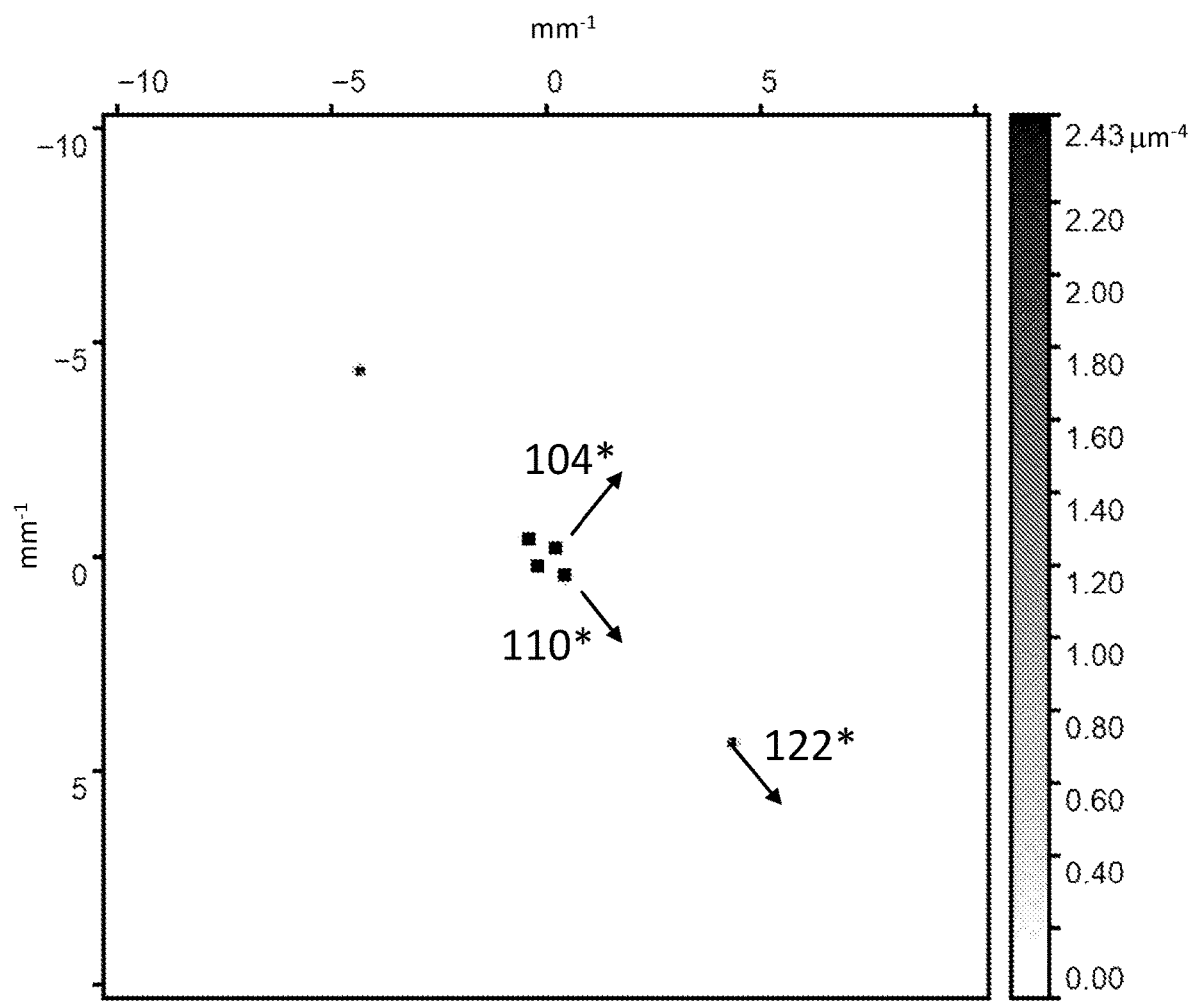
FIG. 16 is a plot showing a Fast Fourier Transform of the optical image of FIG. 13.

FIG. 16 represents a Fast Fourier Transform of the simulated texture represented by FIG. 13, illustrating the high-frequency components of the transform. The period is related to the frequency by the equation X (meters)=$2\pi/X^*$ (meters$^{-1}$) where X is the peak-to-peak period and X* is the respective frequency. Accordingly, the texture periods 104, 110 and 122 (see FIG. 13) have frequencies 104*, 110* and 122*, of 300 m$^{-1}$, 600 m$^{-1}$, and 6000 m$^{-1}$, respectively.

Methods of characterizing anisotropic textures on the treated major surface, e.g., first major surface 14, include optical interferometry (e.g., Zygo NexView) to scan a predetermined area of the substrate, for example using a low-magnification objective. In some embodiments, it may be necessary to scan multiple areas, wherein adjacent scans can be stitched together to obtain a desired total field of view. The resultant image can be processed using an open source image analysis package, e.g., Gwyddion Ver. 2.51. For example, outer edges of the image can be cropped to account for image artifacts and missing data. A 4th-order plane fit can then be used to level the image, with the Z-axis (height) scale constrained, e.g., to +/−10 nm, to enable detection of fine topographical changes. The image can be rotated, if desired, to align the image to correspond to glass motion through the treatment apparatus. The image can then be transformed using a fast Fourier transform to enable analysis of spatial frequency signatures.

Figure 17:
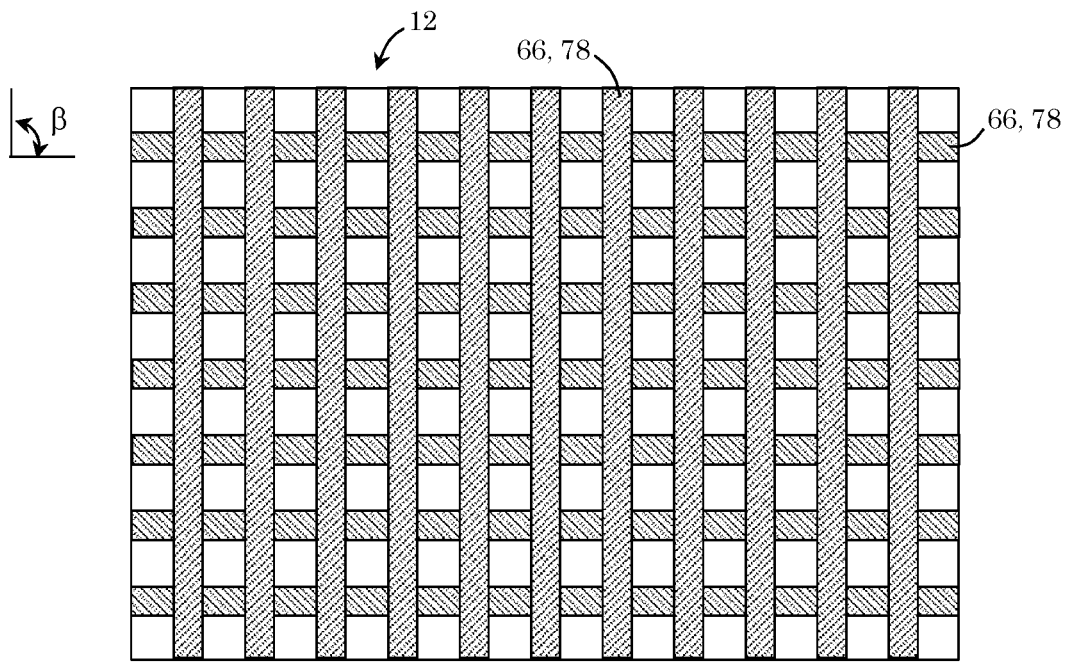
FIG. 17 is a schematic representation of an exemplary arrangement by which a masking material, or etchant, can be applied to a substrate.
Figure 18:
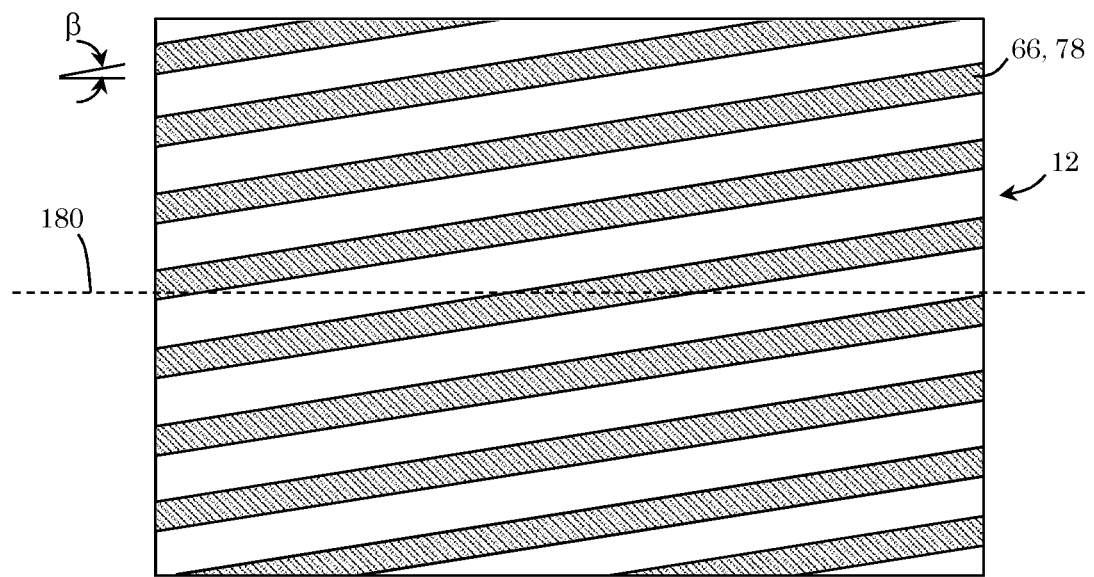
FIG. 18 is a schematic representation of another exemplary arrangement by which a masking material, or etchant, can be applied to a substrate.
Figure 19:
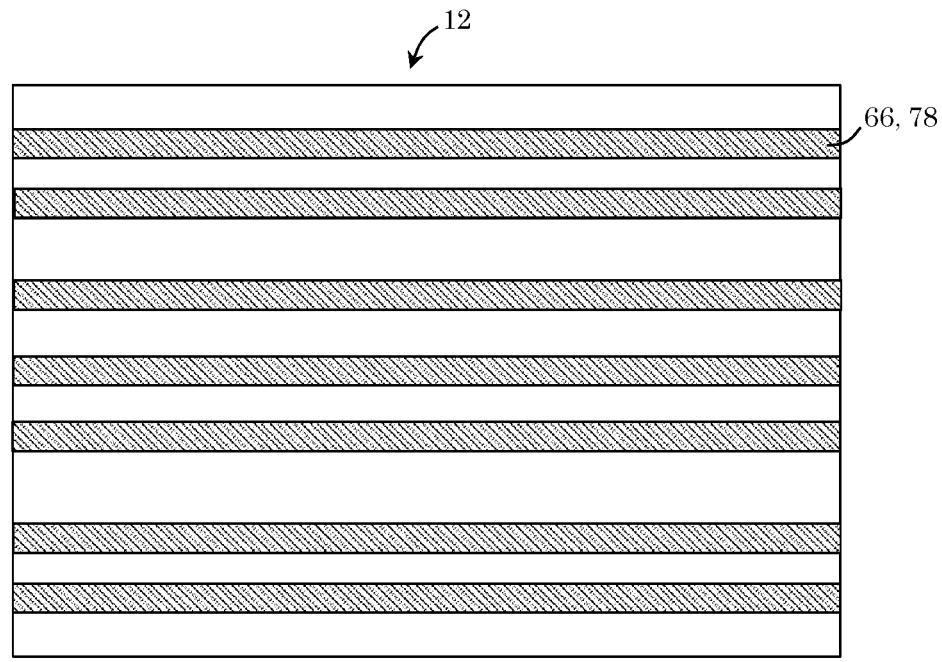
FIG. 19 schematic representation of still another exemplary arrangement by which a masking material, or etchant, can be applied to substrate.

FIGS. 17-19 illustrate example mask and etch patterns that can result in (anisotropic) rows of texture on substrate 12. That is, the cross-hatched regions indicate the areas of application either of masking material 66 with treatment apparatus 10 or the patterned application of etchant with treatment apparatus 100. It should be apparent from the preceding discussion that additional steps may be performed to obtain more complex etch patterns. For example, substrate 12 may be rotated through a predetermined angle and re-masked, then etched or re-etched. For example, in respect of treatment apparatus 10, substrate 12 can be masked by applying rows of masking material 66 in parallel rows in a first direction, then rotating the substrate and applying a second set of rows of masking material in a second direction rotated through predetermined angle β. Angle β can be in a range from about 1° to 90° degrees. FIG. 17 illustrates angle β as 90 degrees (wherein the two patterns are orthogonal rows). FIG. 18 illustrates another embodiment wherein parallel rows of masking material are deposited such that the parallel rows are not parallel with edges of the substrate, for example, not parallel with the long axis 180 of the substrate. That is, the rows of masking material are deposited rotationally offset from axis 180 by angle β.

FIG. 19 illustrates yet another embodiment where masking material 66 (and thus the position of subsequent etched regions), or etchant 78 in the case of treatment apparatus 100, is not applied in evenly spaced rows. This can be accomplished, for example, by spacing the ridges of masking roller 32 (or in the case of treatment apparatus 100, the etchant roller 136) unevenly. It should be apparent that, as described above in respect of treatment apparatus 10, the result is a substrate comprising raised regions where masking material 66 is deposited, and recessed regions where the masking material was not applied. Regarding treatment apparatus 100, raised areas are created where the etchant 78 is not first applied by etchant roller 136, and recessed regions are created where etchant 78 is first applied by the etchant roller. In both cases, either in respect of treatment apparatus 10 or of treatment apparatus 100, any one or more of the first through the fourth textures described above can be created.

Figure 20:
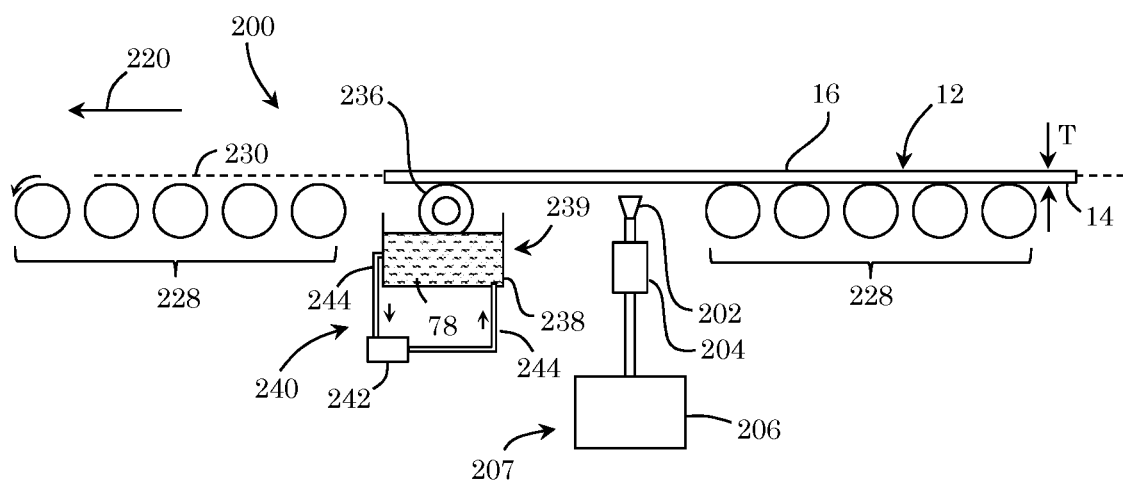
FIG. 20 is a cross-sectional side view of another exemplary treatment apparatus.
Figure 21:
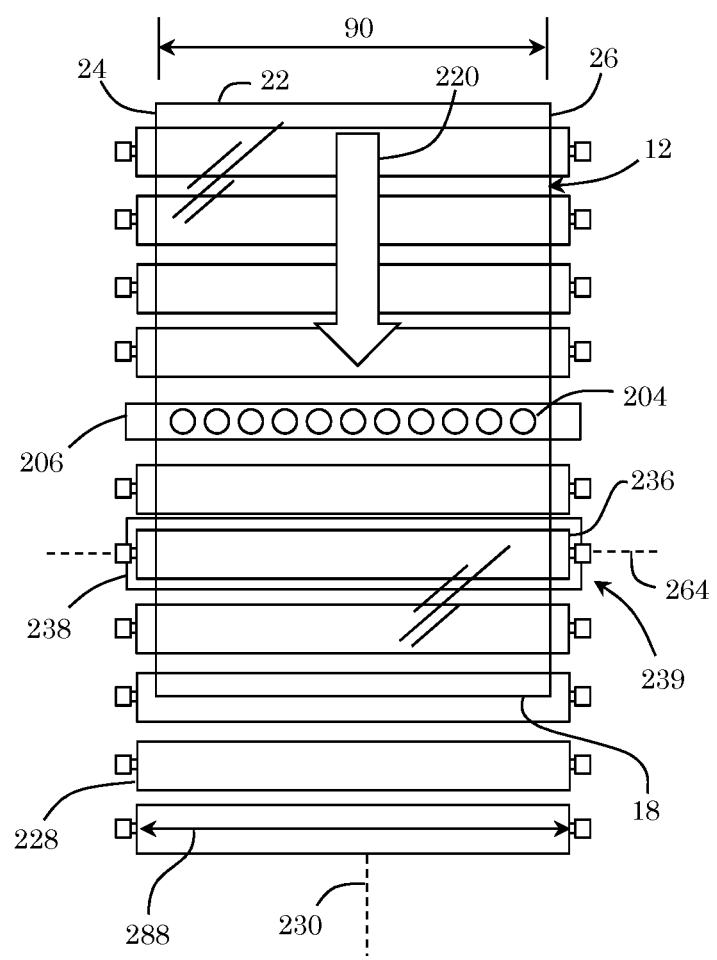
FIG. 21 is a top view of the treatment apparatus of FIG. 20.
Figure 22:
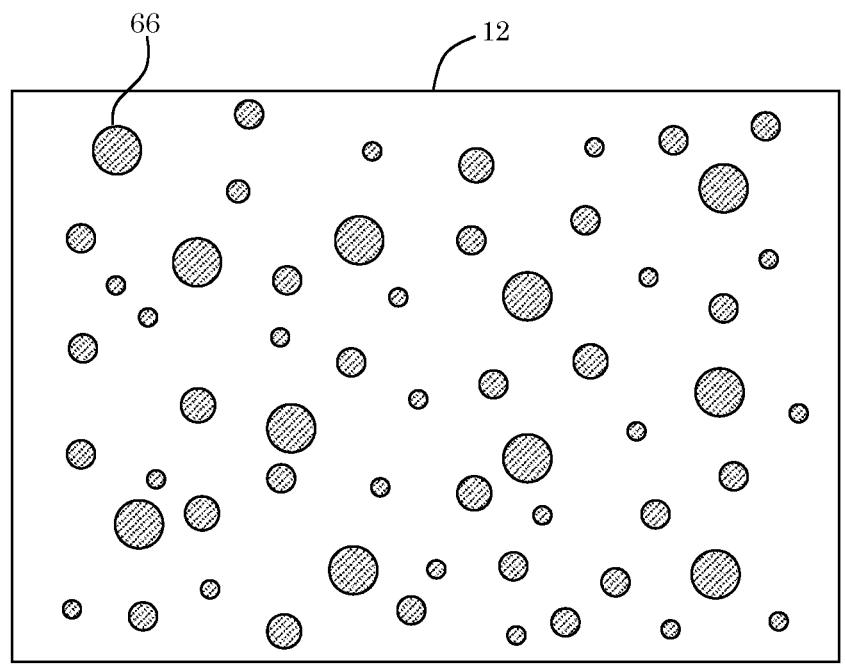
FIG. 22 is a top view of a substrate showing discrete regions of the substrate surface coated with a masking material (or etchant)

In an alternative process, shown in FIGS. 20-21, spray nozzles can be used to deposit masking material 66 in discrete locations. In accordance with FIG. 22, treatment apparatus 200 can comprise a plurality of spray nozzles 202 arranged to extend in a width direction of substrate 12 as substrate 12 is conveyed in conveyance direction 220 along conveyance path 230. Spray nozzles 202 can be in fluid communication with a common plenum 204 which in turn is in fluid communication with container 206 that forms a reservoir 207 for masking material 66. Masking material 66 can comprise, for example, styrene maleic acid (SMA), although in further embodiments, other masking materials may be used, for example acrylates, novolac (a phenol-formaldehyde resin with a formaldehyde-to-phenol molar ratio of less than 1), or silicones. While not shown, spray nozzles 202 can extend in conveyance direction 220 in further embodiments. For example, spray nozzles 202 can be arranged in an array of orthogonal rows and columns of spray nozzles. Spray nozzles 202 can be in the form of inkjet nozzles wherein very fine, high-resolution patterns can be "printed" on the substrate. The discrete locations can result in regular, periodic predetermined patterns, or random or pseudorandom patterns, such as the randomized pattern shown in FIG. 22.

Treatment apparatus 200 may further comprise a plurality of conveyance rollers 228 configured to convey substrate 12 in conveyance direction 220 along conveyance path 230, and a container 238 forming an etchant reservoir 239 for etchant 78. Conveyance rollers 228 can be full-length rollers, rotatably mounted and configured to rotate about respective axes of rotation, wherein a length 288 of the conveyance rollers in a direction orthogonal to conveyance direction 220 can be equal to or greater than a width 90 of substrate 12 defined between first and second side edges 24, 26. Conveyance rollers 228 can be driven rollers. For example, conveyance rollers 228 can be coupled to a motor or motors (not shown) that rotate the conveyance rollers about their respective axes of rotation to convey substrate 12 in conveyance direction 220 along conveyance path 230. In other embodiments, conveyance rollers 228 may be non-driven and individually freely rotatable about their respective axes of rotation. In still other embodiments, treatment apparatus 200 may comprise a combination of driven and un-driven conveyance rollers 228. While conveyance rollers 228 are shown as positioned beneath substrate 12 and thereby supporting substrate 12 on first major surface 14, in further embodiments, additional conveyance rollers 228 may be positioned above substrate 12 and contact second major surface 16. For example, upper conveyance rollers contacting second major surface 16 may be driven rollers that propel substrate 12 in conveyance direction 220 over lower conveyance rollers that are undriven. In some embodiments, one or more pairs of conveyance rollers may be configured to extend only partially in a direction orthogonal to conveyance direction 20. For example, in some embodiments, conveyance rollers, such as upper conveyance rollers contacting second major surface 16 (not shown), may contact edge portions of substrate 12 and not contact central portions of the second major surface 16.

Treatment apparatus 200 may further comprise an etchant roller 236 positioned along conveyance path 230. In some embodiments, treatment apparatus 200 may comprise a single etchant roller 236, although in further embodiments, treatment apparatus 10 may comprise a plurality of etchant rollers 236. Etchant roller 236 can be rotatably mounted and positioned downstream of spray nozzles 202 relative to conveyance direction 20, wherein substrate 12 traveling along conveyance path 30 in conveyance direction 20 encounters etchant roller 236 after spray nozzles 202 have deposited masking material 66 on first major surface 14. In various embodiments, etchant roller 236 may be configured similar or identical to etchant roller 36 of treatment apparatus 10.

Etchant roller 236 can extend across all or a portion of width 90 of substrate 12 in a direction orthogonal to conveyance direction 220. That is, axis of rotation 264 of etchant roller 36 can be orthogonal to conveyance direction 220. Treatment apparatus 200 may further comprise an etchant circulation system 240 in fluid communication with reservoir 239 and configured to circulate etchant 78 through container 238 via pump 242 and piping 244. In embodiments, etchant roller 236 can be rotatably mounted over container 238 such that a peripheral surface of etchant roller 36 is in contact with, for example immersed in, etchant 78 contained in container 238. In various embodiments, etchant 78 can comprise hydrofluoric acid (HF), although in further embodiments, other suitable etchants can be used depending on the material of substrate 12. In examples described herein, etchant 78 comprised 1 molar (M) concentration of $H_3PO_4$+0.35M NaF at 40° C. However, other suitable etchants may be used. HF-based etching of glass, for example, is initially time dependent, where achievable average roughness Sa values eventually saturate at about 0.5 nm. The resulting surface texture of the treated substrate 12 can be on the nanometer scale, both in height as well as laterally, with correlation lengths also on the order of nanometers.

While the foregoing embodiments describe etching a major surface of substrate 12, by substituting a leachant for etchant 78, treatment apparatus 10, 100, or 200 can be used to produce a variation in chemical composition at the surface of the substrate that mimics to a degree the variation in surface texture seen with the etchant. For example, an exemplary embodiment can comprise conveying substrate 12 along a conveyance path in a conveyance direction, applying a masking material to a first area of a first major surface 14 of substrate 12 as the substrate is conveyed, applying a leachant over the first area of first major surface 14, first major surface 14 comprising a first chemical composition, and the leachant leaching at least one constituent of the first chemical composition from first major surface 14, wherein as a result a concentration of the at least one constituent of the first chemical composition can vary periodically along a first axis with a first spatial period after the leaching. Suitable leachants can comprise, but are not limited to, HCl, $H_2SO_4$, $HNO_3$, or combinations thereof. Glass constituents that can be leached include, but are not limited to, Mg (magnesium), Ca (calcium), Sr (strontium), Al (aluminum), and/or B (boron).

Examples

Corning Lotus NXT samples with a thickness of 0.5 millimeters and a surface area (per major surface) of 150 $mm^2$ were etched in accordance with the masking techniques described herein. Four etch times were conducted, with etchant exposure times ranging from 40 seconds to 160 seconds in increments of 40 seconds. Samples were etched at three different speeds: 25 millimeters/second, 65 millimeters/second and 100 millimeters/second. The resulting surfaces were analyzed using optical interferometry (Zygo NexView) using the lowest magnification objective to scan a 6×6 image matrix and stitching the frames together to provide a total field of view of about 32 $mm^2$. The resultant images (see FIG. 13 as an example) were processed using Gwyddion Ver. 2.51 following the procedure outlined below.

Figure 23:
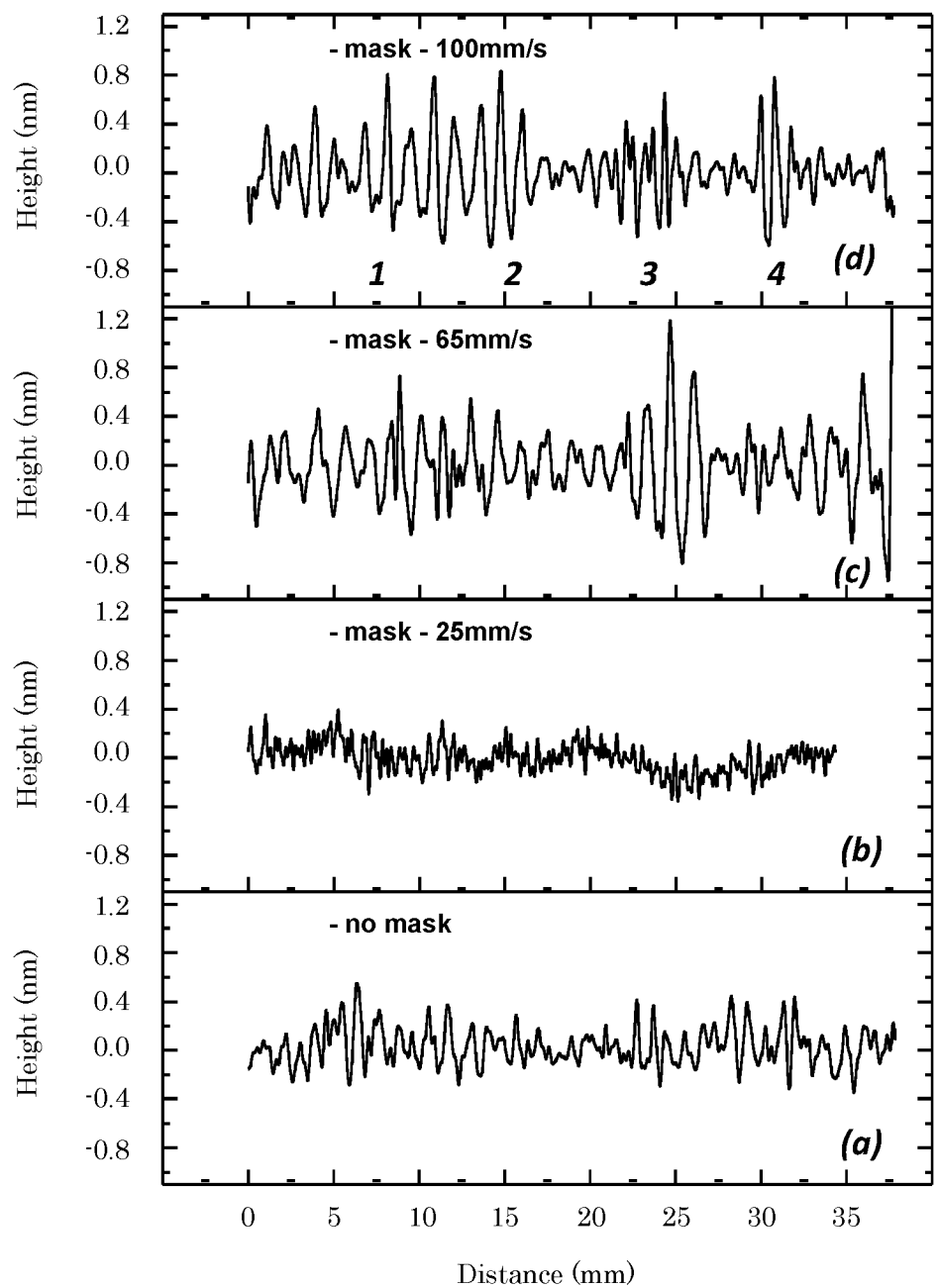
FIG. 23 is a series of plots showing surface height data in nanometers as a function of traverse speed for masked substrate samples compared to a sample with no mask.

The longest etch time (160 seconds) produced the most noticeable texture features. Data was also collected from untreated Lotus NXT for comparison purposes, and a substrate sample that had undergone a general surface etch with 1M $H_3PO_4$+0.35M NaF at 40° C. AFM was done at each condition to evaluate nano-texture. All etch conditions showed similar substrate surface characteristics via AFM imaging. Line profiles for all four surfaces are shown in FIG. 23. The general etched surface (1M $H_3PO_4$+0.35M NaF) without applied masking showed a hash pattern with fringes extending along lines both parallel and perpendicular to the roller motion. These fringe structures had substantially equal peak-to-valley magnitudes across the surface, with maximum observed values of approximately +0.4 nanometers and −0.25 nanometers, respectively (FIG. 23(*a*)). The application of masking at slow speed (e.g., 25 millimeters/second) did not significantly change the overall line profile (FIG. 23(*b*)). At higher masking application speeds (65 millimeters/second and 100 millimeters/second), the bands of texture became more pronounced both visually and through line profile extraction. The frequencies directional with the roller axis became washed out and poorly defined. The height differences in the masked regions are also clearly observable in the line profiles shown in FIGS. 23(*c*) and 23(*d*). Some bands of texture appeared to be applied slightly off-angle relative to other texture bands and because of this the increased peak-to-valley magnitudes (approximately +1.1 nanometers to about −0.8 nanometers) indicated these regions are merged together in the line profile. The other bands are more distinct, persisting for and separated by distances on the order of several mm, within the range of ridge-valley radii seen on the mask patterning roller. These textured surfaces have been shown to improve ESC performance by as much as about 12% depending on masking application and etching speed, via preliminary Lift Test measurements. The Lift Test comprises a flat vacuum surface (e.g., vacuum plate) fitted with a 10 cm×10 cm stage plate, and insulating lift pins surrounding the stage plate, and an array of electrostatic field meters suspended above the glass plate surface. The measurement sequence begins with the sample to be tested placed on lift pins positioned in the vacuum plate, etched surface down. High-flow corona discharge-type ionizers are used to eliminate any residual charge in the sample. Vacuum is generated via a venturi method and the sample is lowered onto the vacuum plate using the lift pins, thereby creating contact between the glass plate and the vacuum surface under a constant and controlled pressure. This state is maintained for several seconds, after which the vacuum is released and the glass sample plate raised from the vacuum surface via the lift pins to a height of about 80 cm (about 10 mm below the field meter array). The glass surface voltage is monitored and recorded by the field meters for a period sufficiently long to obtain data for the maximum voltage generated from the vacuum process as well as its subsequent decay rate.

Figure 24:
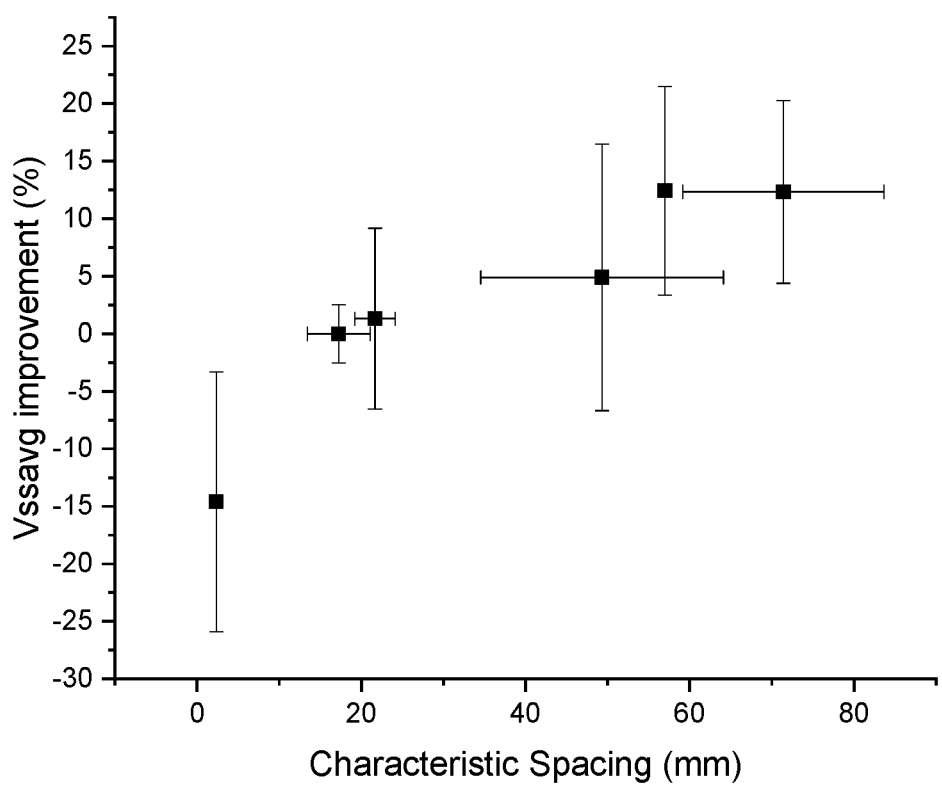
FIG. 24 is a plot showing average voltage as a function of average surface roughness (Ra) after a Lift Test.

FIG. 24 is a plot showing average % voltage improvement as a function of characteristic spacing, where characteristic spacing is analogous to the period of the waveform for anisotropic textures. The data, shown with confidence intervals, represents the percent change (decrease or increase) in the maximum lift test voltage V (V@80 cm lift pin height) obtained from etched samples relative to untreated, unetched samples and provides insight into the electrostatic charging (ESC) of the tested samples. For example, a 0% percent change would indicate the same voltage generation as the control sample; 100% would indicate the virtual elimination of surface voltage generation; and −100% would indicate a two-fold increase in surface voltage generation over the control sample. The testing is performed in a Class 1000 cleanroom and 40% relative humidity, with the apparatus itself contained within an anti-static acrylic housing equipped with dedicated HEPA air filtration. The data show that as characteristic spacing of the anisotropic texture or textures increased, for example through a range from about 0 mm to about 75 mm, the ESC improvement (Vssavg) increased.

It will be apparent to those skilled in the art that various modifications and variations can be made to embodiments of the present disclosure without departing from the spirit and scope of the disclosure. Thus, it is intended that the present disclosure cover such modifications and variations provided they come within the scope of the appended claims and their equivalents.

What is claimed is:

1. A glass substrate, comprising:
a first major surface comprising a periodic first texture, the first texture comprising a first magnitude and a first spatial period in a first direction along a first axis parallel to the first major surface, the first texture extending a length along the first axis equal to or greater than two times the first spatial period, and an isotropic second texture co-located with the first texture, the second texture comprising an average surface roughness Sa equal to or less than 1 nanometer,
wherein the first magnitude is in a range from 2 nanometers to 500 nanometers, and
wherein the first major surface further comprises a periodic third texture co-located with the first texture, the third texture comprising a second magnitude and a second spatial period along a second axis parallel to the first major surface and different from the first axis, the third texture extending a length along the second axis equal to or greater than two times the second spatial period.

2. The glass substrate of claim 1, wherein the first spatial period is in a range from 0.1 millimeters to 100 millimeters.

3. The glass substrate of claim 1, wherein the second axis is orthogonal to the first axis.

4. The glass substrate of claim 1, wherein the second magnitude is in a range from 2 nanometers to 500 nanometers.

5. The glass substrate of claim 4, wherein the second spatial period is in a range from 0.1 millimeters to 25 millimeters.

6. The glass substrate of claim 5, wherein the first major surface further comprises a periodic fourth texture co-located with the third texture, the fourth texture comprising a third magnitude and a third spatial period along the second axis, the fourth texture extending a length along the second axis equal to or greater than two times the third spatial period.

* * * * *